(12) United States Patent
Kim et al.

(10) Patent No.: US 10,308,117 B2
(45) Date of Patent: Jun. 4, 2019

(54) VEHICLE CONTROL DEVICE AND METHOD THEREFOR

(71) Applicant: LG ELECTRONICS INC., Seoul (KR)

(72) Inventors: Sujin Kim, Seoul (KR); Bumhyeon Baek, Seoul (KR); Honggul Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/744,710

(22) PCT Filed: Aug. 17, 2015

(86) PCT No.: PCT/KR2015/008554
§ 371 (c)(1),
(2) Date: Jan. 12, 2018

(87) PCT Pub. No.: WO2017/010601
PCT Pub. Date: Jan. 19, 2017

(65) Prior Publication Data
US 2018/0208060 A1    Jul. 26, 2018

(30) Foreign Application Priority Data

Jul. 15, 2015 (KR) .................. 10-2015-0100614

(51) Int. Cl.
*B60K 37/02* (2006.01)
*B60W 50/14* (2012.01)
(Continued)

(52) U.S. Cl.
CPC .............. *B60K 37/02* (2013.01); *B60K 35/00* (2013.01); *B60W 50/10* (2013.01); *B60W 50/14* (2013.01);
(Continued)

(58) Field of Classification Search
None
See application file for complete search history.

(56) References Cited

U.S. PATENT DOCUMENTS 8,245,078 B1 * 8/2012 Chatterjee ............... G06F 3/048
714/15
2003/0036843 A1    2/2003 Okude et al.
(Continued)

FOREIGN PATENT DOCUMENTS

JP      2009073386      4/2009
KR   10-2002-0092969   12/2002
(Continued)

OTHER PUBLICATIONS

Intel, Reducing In-Vehicle Infotainment system Cost, Solution Brief, pp. 1-4 (Year: 2009).*

(Continued)

*Primary Examiner* — Richard M Camby
(74) *Attorney, Agent, or Firm* — Lee, Hong, Degerman, Kang & Waimey

(57) ABSTRACT

The present invention relates to a vehicle control device that can display various pieces of image information associated with a state of a vehicle, and a control method for the device. The vehicle control device comprises: a single touch screen; and a single control unit, which includes at least two different operating system programs which independently operate, and controls each of the operating system programs to display image information on the single touch screen, wherein the control unit controls the touch screen to enable at least one of the operating system programs to display image information on the touch screen, according to at least one of operation states of the operating system programs and the state of the vehicle.

19 Claims, 14 Drawing Sheets

(51) Int. Cl.
*B60K 35/00* (2006.01)
*G06F 3/0488* (2013.01)
*B60W 50/10* (2012.01)

(52) U.S. Cl.
CPC .... *G06F 3/0488* (2013.01); *B60K 2350/1028* (2013.01); *B60K 2350/1072* (2013.01); *B60K 2350/352* (2013.01); *B60K 2350/357* (2013.01); *B60K 2350/901* (2013.01); *B60K 2350/908* (2013.01); *B60W 2050/146* (2013.01); *B60W 2520/10* (2013.01); *B60W 2550/10* (2013.01); *B60W 2550/12* (2013.01)

(56) References Cited

U.S. PATENT DOCUMENTS

2014/0309806 A1* 10/2014 Ricci .................. B60Q 1/00
 701/1
2014/0309870 A1* 10/2014 Ricci .................. H04W 4/21
 701/36

FOREIGN PATENT DOCUMENTS

| KR | 10-2010-0122924 | 11/2010 |
| KR | 10-2014-0068573 | 6/2014 |

OTHER PUBLICATIONS

PCT International Application No. PCT/KR2015/008554, International Search Report dated Mar. 31, 2016, 4 pages.

* cited by examiner

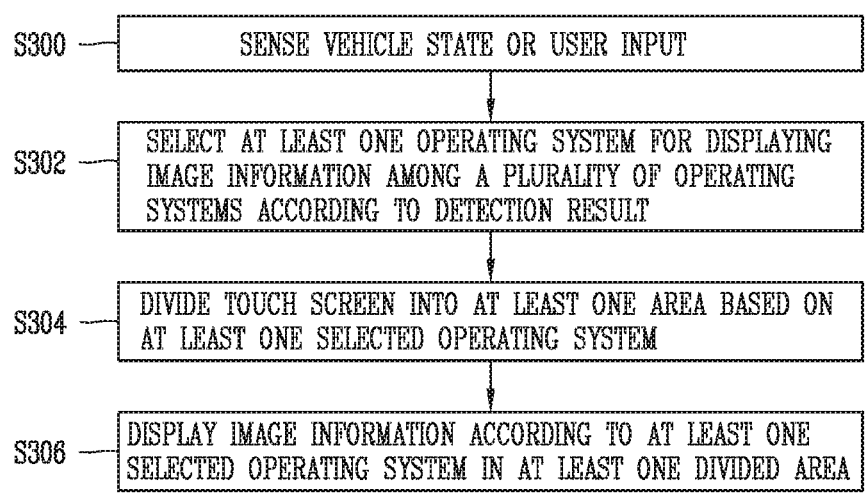

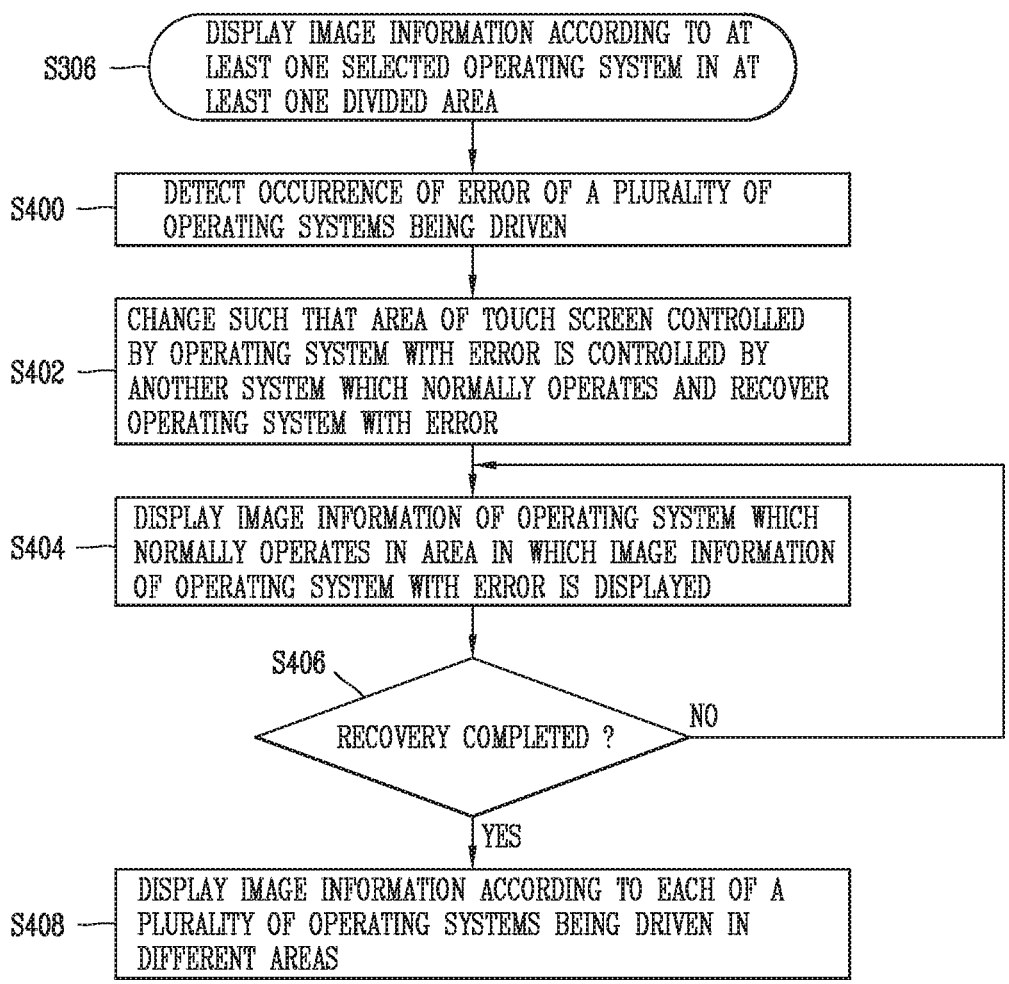

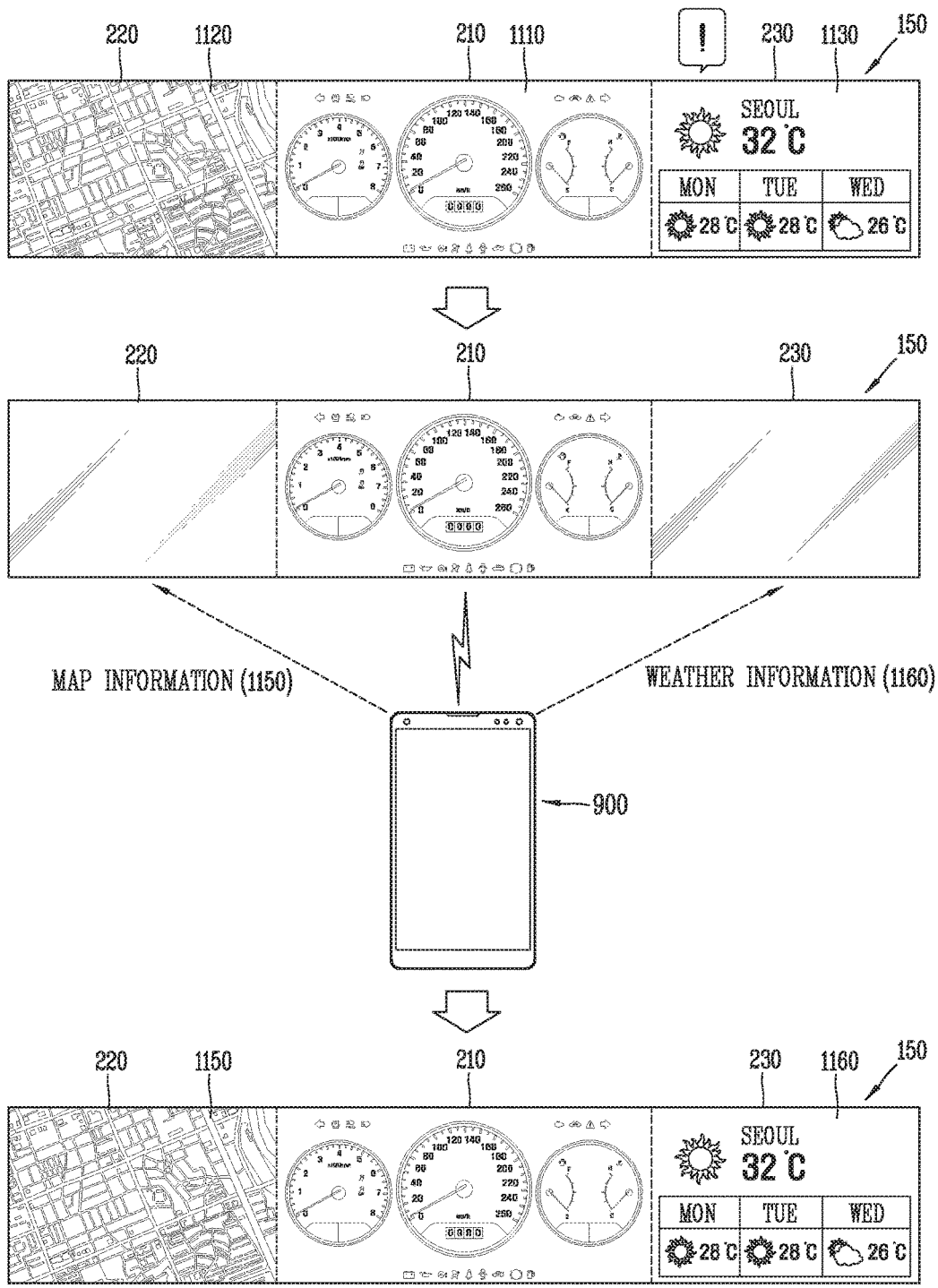

VEHICLE CONTROL DEVICE AND METHOD THEREFOR

CROSS-REFERENCE TO RELATED APPLICATIONS

This application is the National Stage filing under 35 U.S.C. 371 of International Application No. PCT/KR2015/008554, filed on Aug. 17, 2015, which claims the benefit of earlier filing date and right of priority to Korean Application No. 10-2015-0100614, filed on Jul. 15, 2015, the contents of which are all hereby incorporated by reference herein in their entirety.

TECHNICAL FIELD

The present invention relates to a vehicle control device capable of displaying various image information related to a state of a vehicle and a method for controlling the same.

BACKGROUND ART

Unlike the conventional technology, the current vehicle control technology allows a vehicle to provide a variety of functions to a user. Accordingly, image information on various functions that may be provided is displayed through a display unit provided inside the vehicle and the user can check various states, functions, navigation information; and the like, of the vehicle based on the displayed image information.

On the other hand, the diversification of the functions available in the vehicle requires a CPU of a vehicle control device to handle a more complicated and larger amount of operation. As technologies have been developed, CPUs are more highly integrated and have high performance and hardware characteristics meet the demand. However, due to the structural characteristics caused in a structure of the complicated vehicle control device, safety is inevitably lowered, compared with the use of simple functions, and in terms of characteristics of the vehicle control device, a degradation of safety may cause a high risk.

Accordingly, various methods for maintaining safety, while providing various functions related to vehicles, have been devised. For example, a method of providing a plurality of CPUs according to vehicle functions, providing a plurality of display units respectively connected to the CPUs, and displaying image information processed by the respective CPUs on each of the display units has been devised.

In this case, however, each CPU is completely independently driven to require separate hardware resources, i.e., a memory, a display, etc., thus incurring excessive cost. In addition, since each of the CPUs is driven separately, repeated tasks such as detecting a state of a vehicle are separately handled, or tasks processed in each CPU conflicts with each other. Also, in order to exchange information between the CPUs, information must be exchanged through a data transfer unit such as a bus connected between the CPUs, and thus, an amount of exchanged information is limited according to a limited bandwidth, resulting in difficulty in free utilization of the display.

Therefore, researches are being actively conducted to provide a variety of functions that can satisfy user demands, while ensuring high stability, and to utilize the display freely according to the needs of the user.

DISCLOSURE OF THE INVENTION

Therefore, an object of the present invention is to provide a vehicle control device capable of ensuring high stability in functions related to control of a vehicle, as well as displaying various functions and information related to a vehicle, a method for controlling the vehicle control device.

Another object of the present invention is to provide a vehicle control device allowing a user to more freely utilize a display unit that displays a function which may be provided in a vehicle and information related to the vehicle according to the needs of the user, and a control method of the vehicle control device.

To achieve these and other advantages and in accordance with the purpose of the present invention, as embodied and broadly described herein, there is provided a vehicle control device includes: one touch screen; and one controller including at least two different operating system programs which are independently driven and controlling the operating system programs to display each image information in the one touch screen, wherein the controller may control the touch screen such that at least one of the operating system programs displays image information on the touch screen according to at least one of a state of the vehicle and an operation state of the operating system programs.

In an embodiment, the operating system programs may include a first operating system program controlling a plurality of preset functions among functions related to a state of the vehicle and driving and controlling of the vehicle and displaying image information related thereto; and a second operating system program controlling at least some of functions excluding functions controlled by the first operating system program, among functions which may be provided in the vehicle, and displaying image information related thereto.

In an embodiment, the first operating system program and the second operating system program may be set to be different in safety and reliability level related to whether connection to another device is restricted and whether a user input is restricted, and the first operating system program may be designed to satisfy at least one preset international safety standard.

In an embodiment, when a plurality of operating system programs operate, the operating system programs may display image information in different areas of the touch screen, and an area on the touch screen in which image information is displayed by the first operating system may be an area in which user's touch input is restricted.

In an embodiment, the controller may change a position or a size of an area in which image information corresponding to each operating system program is displayed, according to a user's touch input.

In an embodiment, the controller may be driven in any one of a plurality of different operation modes according to a result of detecting a state of the vehicle, and, in the plurality of different operation modes, at least one of the number and type of operating system programs displaying image information on the touch screen and functions provided in the operating system programs may be different.

In an embodiment, the result of detecting a state of the vehicle may be a result of detecting at least one of a speed of the vehicle, a position of the vehicle, weather and intensity of illumination around the vehicle, the presence or absence of another vehicle or an obstacle near the vehicle, and the number of occupants present in the vehicle.

In an embodiment, when a speed of the vehicle is a preset level or higher, the controller may be driven in an operation mode in which pieces of image information related to functions controlled by the first operating system program is displayed in the entire area of the touch screen.

In an embodiment, the touch screen may be formed such that, when an error occurs in at least one of the operating system programs, an area of the touch screen in which image information of the error-generated operating system program is displayed is controlled by another operating system program which normally operates.

In an embodiment, the first operating system program may display image information according to functions managed by the first operating system program in a partial area on the touch screen controlled according to the second operating system program until the second operating system program recovers the error.

In an embodiment, any one of the functions controlled by the second operating system program may be a function of displaying image information corresponding to information received from a mobile terminal connected to the vehicle in at least some of areas on the touch screen displaying image information under the control of the second operating system program, and the information received from the mobile terminal may be information related to a screen displayed on a display unit of the mobile terminal or information related to any one of functions executable in the mobile terminal.

In an embodiment, the second operating system program may execute a function corresponding to the information received from the mobile terminal and display image information related to the executed function in a partial area on the touch screen controlled by the second operating system program.

In an embodiment, the controller may divide some of areas on the touch screen controlled by the second operating system program into a plurality of areas, and display image information corresponding to pieces of different information received from the mobile terminal in each of the plurality of areas.

In an embodiment, the pieces of different information received from the mobile terminal may be pieces of information received from different mobile terminals connected to the vehicle.

In an embodiment, when an error occurs in the second operating system program, the first operating system program may display image information according to information received from the mobile terminal in a partial area on the touch screen controlled according to the second operating system program until the error is recovered.

In an embodiment, the information received from the mobile terminal may be information related to a specific function executed in the mobile terminal, and the specific function may be a function corresponding to at least one of functions executed by the second operating system program before the error of the second operating system program occurs.

In an embodiment, the controller may control the operating system programs to share at least a partial area of a memory so that the operating system programs can simultaneously use the information stored in the at least partial area of the memory.

In an embodiment, the operating system programs may display pieces of different information related to the information stored in the shared memory area, in different areas on the touch screen.

In an embodiment, the touch screen may display a screen in which a plurality of layers overlap each other, and the controller may control the touch screen such that the operating system programs output image information to different layers among the plurality of layers.

To achieve these and other advantages and in accordance with the purpose of the present invention, as embodied and broadly described herein, there is provided a method for controlling a vehicle control device which controls a vehicle by operating system programs which are independently driven, including: detecting at least one of a speed of the vehicle, a current position of the vehicle, and internal and external environments of the vehicle; and displaying pieces of image information related to functions of the vehicle controlled by each of the operating system programs in different areas of a touch screen provided in the vehicle according to a detection result, wherein the displaying of pieces of image information on the touch screen may include: displaying, by at least one of the operating system programs, image information on the touch screen according to at least one of a detected state of the vehicle and an operation state of the operating system programs.

Effects of the vehicle control device and the method for controlling the vehicle control device according to the present invention are as follows.

According to at least one of the embodiments of the present invention, the controller drives an operating system program, which manages main functions of a vehicle, independently of an operating system program that manages other functions of the vehicle, and displays pieces of image information related to the operating system programs in different areas of a touch screen, thereby providing a variety of functions that meet the needs of the user, while ensuring high stability.

According to at least one of the embodiments of the present invention, at least one of a plurality of operating systems, which are independently driven from each other, controls the entire area of the touch screen based on a user selection, a state of a vehicle, or a driving state of an operating system program, whereby the touch screen may be more efficiently used.

According to at least one of the embodiments of the present invention, a plurality of operating systems that are independently driven can share a memory storing information detected from a vehicle, whereby different operating system programs may simultaneously use the information detected by the vehicle.

BRIEF DESCRIPTION OF THE DRAWINGS

FIG. 3 is a flow chart illustrating an operation process of displaying image information related to a plurality of operating systems in a vehicle control device according to an embodiment of the present invention;

FIG. 4 is a flow chart showing an operation process of displaying image information of an operating system which normally operates, in an area of a touch screen where image information of the operating system in which an error occurs is displayed, in the vehicle control device according to the embodiment of the present invention;

FIG. 11 is an exemplary view showing an example of displaying information received from a mobile terminal in an area of a touch screen on which image information of an operating system in which an error has occurred is displayed, in a vehicle control device according to the embodiment of the present invention.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
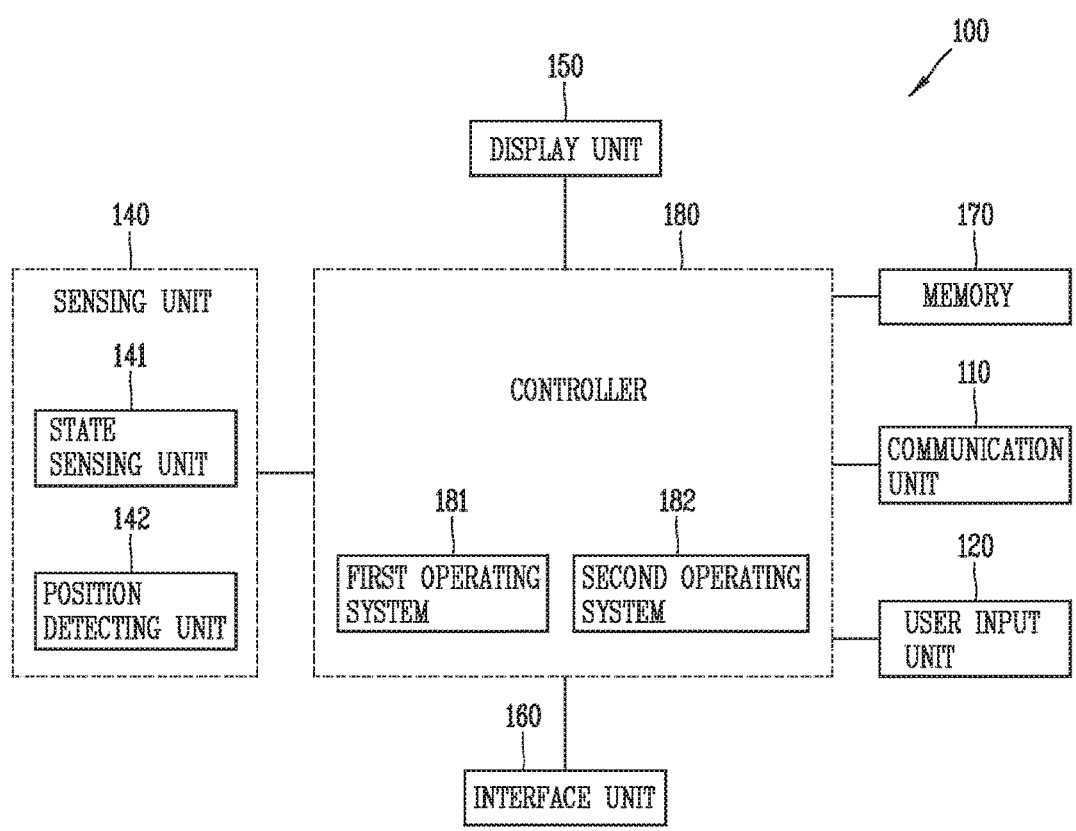
FIG. 1 is a block diagram showing a configuration of a vehicle control device according to an embodiment of the present invention.

First, FIG. 1 is a block diagram showing a vehicle control device 100 related to the present invention.

The vehicle control device 100 includes a communication unit 110, a user input unit 120, a sensing unit 140, a display unit 150, an interface unit 160, a memory 170, and a controller 180. The components illustrated in FIG. 1 are not essential to the implementation of the vehicle control device 100, and the vehicle control device 100 described herein may have greater or fewer components than those enumerated above.

More specifically, among the above components, the communication unit 110 may include one or more modules enabling wireless communication between the vehicle control device 100 and the wireless communication system, between the vehicle control device 100 and a specific mobile terminal, or between the vehicle control device 100 and an external server. In addition, the communication unit 110 may include one or more modules connecting the vehicle control device 100 to one or more networks.

The display unit 150 may have an inter-layer structure with a touch sensor or may be integrally formed to implement a touch screen. Such a touch screen may function as the user input 120 that provides an input interface between the vehicle control device 100 and a user and may provide an output interface between the vehicle control device 100 and the user. In the following description, the display unit 150 is implemented as a touch screen, for example.

The interface unit 160 serves as an interface for various kinds of external devices connected to the vehicle control device 100. The interface unit 160 may include at least one of a wired/wireless headset port, an external charger port, a wired/wireless data port, a memory card port, a port connecting a device having an identification module, an audio I/O port, a video I/O port, and an earphone port. When the interface unit 160 is connected to an external device, the vehicle control device 100 may perform appropriate control related to the connected external device.

In addition, the memory 170 stores data that supports various functions of the vehicle control device 100. The memory 170 may store a plurality of application programs (application programs or applications) driven in the vehicle control device 100, and data and commands for an operation of the vehicle control device 100. At least some of these applications may be downloaded from an external server via wireless communication. At least some of these application programs may be stored in the vehicle control device 100 at the time when the vehicle is released for the basic functions of the vehicle control device 100 (for example, a current speed of the vehicle, an engine RPM (Revolution Per Minute), a function to indicate a fuel amount, etc.). On the other hand, the application program may be stored in the memory 170, may be installed on the vehicle control device 100, and may be driven by the controller 180 to perform an operation (or function) of the vehicle control device 100.

In addition to the operation related to the application program, the controller 180 generally controls an overall operation of the vehicle control device 100. The controller 180 may process signals, data, information, and the like, input or output through the above-described components, or may drive an application program stored in the memory 170 to provide or process appropriate information or functions to the user.

At least some of the above components may operate in cooperation with one another to implement the operation, control, or control method of the vehicle control device 100 according to the various embodiments described below. In addition, the operation, control, or control method of the vehicle control device 100 may be implemented by driving at least one application program stored in the memory 170.

Hereinafter, the components enumerated above will be described in more detail with reference to FIG. 1, before explaining various embodiments implemented through the vehicle control device 100 described above.

Here, another mobile terminal may be a wearable device (e.g., a smart watch, a smart glass, or HMD (head mounted display) capable of exchanging data with the vehicle control device 100 (or capable or interworking with the vehicle control device 100) according to the present invention. The near field communication module can detect (or recognize) a wearable device capable of communicating with the vehicle control device 100 around the vehicle control device 100. Further, when the detected wearable device is a device authenticated to communicate with the vehicle control device 100 according to the present invention, the controller 180 may transmit at least a part of the data processed in the wearable device to the vehicle control device 100 via the short-range communication module to the control device 100.

Meanwhile, the sensing unit 140 may sense at least one of information in the vehicle control device 100, surrounding environment information surrounding the vehicle control device 100, and user information, and generates a sensing signal corresponding thereto. The controller 180 may control driving or an operation of the vehicle control device 100 or perform data processing, function, or operation related to an application program installed in the vehicle control device 100 based on the sensing signal.

As described above, the sensing unit may be implemented to include various sensors such as a speed sensor, a fuel sensor, and a temperature sensor, and the like, and may detect various states of the vehicle based on the measured values of the sensors. That is, based on at least one of the sensors, the controller 180 can detect various states related to a driving state of the vehicle, such as whether the vehicle is currently driving, a driving speed of the vehicle, an RPM of the engine, and the like.

Meanwhile, the sensing unit 140 may sense current various states of the vehicle using the sensors. That is, the sensing unit 140 may sense an amount of fuel currently remaining in the vehicle using the fuel sensor, or may sense a current temperature of a coolant and an amount of the coolant using a sensor provided in a coolant tank. Or, the sensing unit 140 may sense whether various components or functions provided in the vehicle operate normally. A component of the sensing unit 140 that senses various states of the vehicle will be referred to as a state sensing unit 141.

The sensing unit 140 also includes at least one module for acquiring a position of the vehicle, and can detect a position of the vehicle based on information obtained from the module. The module for acquiring a position of the vehicle may be a GPS (Global Positioning System) module or a WiFi (Wireless Fidelity) module. A component of the sensing unit 140 that detects the current position of the vehicle will be referred to as a position detecting unit 142.

For example, the position detecting unit 142 can acquire a current position of the vehicle based on a signal transmitted from a GPS satellite via the GPS module. As another example, the position detecting unit 142 may acquire a current position of the vehicle based on information of a wireless access point (AP) that transmits or receives a wireless signal with the Wi-Fi module through the Wi-Fi module. If necessary, the position detecting unit 142 may perform at least one of the functions of the module of the communication unit 110 in order to obtain data regarding a position of the vehicle, in place of or additionally. Also, the position detecting unit 142 is a module used for acquiring a current position of the vehicle, and is not limited to a module for directly calculating or acquiring the position of the vehicle.

On the other hand, the touch screen 150 displays (outputs) information processed in the vehicle control device 100. For example, the touch screen 150 may display execution screen information of an application program driven in the vehicle control device 100, or UI (User Interface) and GUI (Graphic User Interface) information according to the execution screen information.

The interface unit 160 serves as an interface for communication with all external devices connected to the vehicle control device 100. The interface unit 160 receives data from an external device or transmits data in the vehicle control device 100 to an external device. For example, a wired/wireless headset port, an external charger port, a wired/wireless data port, a memory card port, a port for connecting a device including an identification module, an audio I/O port, a video I/O port, an earphone port, and the like, may be included in the interface unit 160.

Meanwhile, as described above, the controller 180 controls a general operation of the vehicle control device 100. Also, the controller 180 may drive the vehicle according to a user's operation and perform the functions related to driving of the vehicle and a state of the vehicle. In this case, the controller 180 may display image information related to various functions related to the driving of the vehicle and the state of the vehicle on the touch screen 150.

Meanwhile, a plurality of operating system programs may be installed in the controller 180 of the vehicle control device 100 according to the embodiment of the present invention. The plurality of operating system programs may be independently operated on one controller 180 by software such as a hypervisor, and may be configured to control other components of the vehicle, respectively.

Meanwhile, the plurality of operating system programs may share at least some areas of the memory 170 storing various information related to the vehicle and information sensed in the vehicle. For example, the plurality of operating system programs may read information stored in the memory 170 through the same driver accessible to the shared area of the memory 170, thereby sharing and simultaneously using the information stored in at least partial area of the memory 170. Therefore, in the present invention, the different operating system programs may exchange associated information with each other, without connection through a network or the like.

The controller 180 may control the touch screen 150 such that image information related to the plurality of operating system programs is displayed in different areas of the touch screen 150.

In this case, any one of the plurality of operating system programs may control functions previously set as main functions among functions available in the vehicle, and display various image information related to the functions set as the main functions on the touch screen 150. Here, the 'main function' may be a function related to driving of the vehicle and control of the vehicle. In the following description, an operating system program for controlling the functions set as the 'main functions' will be referred to as a 'first operating system 181' and an area of the touch screen 150 for displaying image information under the control of the first operating system 181 will be referred to as a cluster area.

Meanwhile, the operating system program other than the first operating system may control functions other than the functions set as the main functions among the functions that may be provided in the vehicle and display various image information related to the respective functions on the touch screen 150. These functions may include various functions provided for the user convenience, such as a function of providing weather information, a navigation function, a function of playing music, and the like. Hereinafter, an operating system program providing various functions of the vehicle provided for user convenience will be referred to as a 'second operating system 182' and an area of the touch screen 150 displaying image information under the control of the second operating system 182 will be referred to as an infotainment area.

Meanwhile, the first operating system 181 and the second operating system 182 may have different levels of reliability. Here, the level of reliability may determine accessibility of the operating system. The 'accessibility' may be whether or not control the operating system may be controlled according to a user input, and whether the corresponding operating system may be connected to another device. That is, as the level of reliability is higher, isolation of the operating system is increased and connection with other devices and a user input may be limited. Also, as described above, if an operating system program controlling functions related to a state of the vehicle and driving and controlling of the vehicle is the first operating system 181, the first operating system 181 may have a higher level of reliability than the second operating system 182. In this case, the first operating system 181, among the operating systems, may be designed to satisfy the International Standard for Safety of Automobile Functionalities such as ISO 26262 and a B grade, i.e., an ASIL-B grade, in the Automotive Safety Integrity Level (ASIL), which is a criterion expressing a degree of lethality associated with an automotive system).

On the other hand, the controller 180 can display image information related to functions controlled by each of the plurality of operating system programs in different areas of the touch screen 150. For example, the controller 180 may form a plurality of layers corresponding to operating system programs, and may display image information on the touch screen 150 by overlapping the plurality of layers. Here, the plurality of operating system programs may display image information in different areas that do not overlap each other in each layer, so that image information displayed by each operating system program may not overlap each other.

Figure 2:
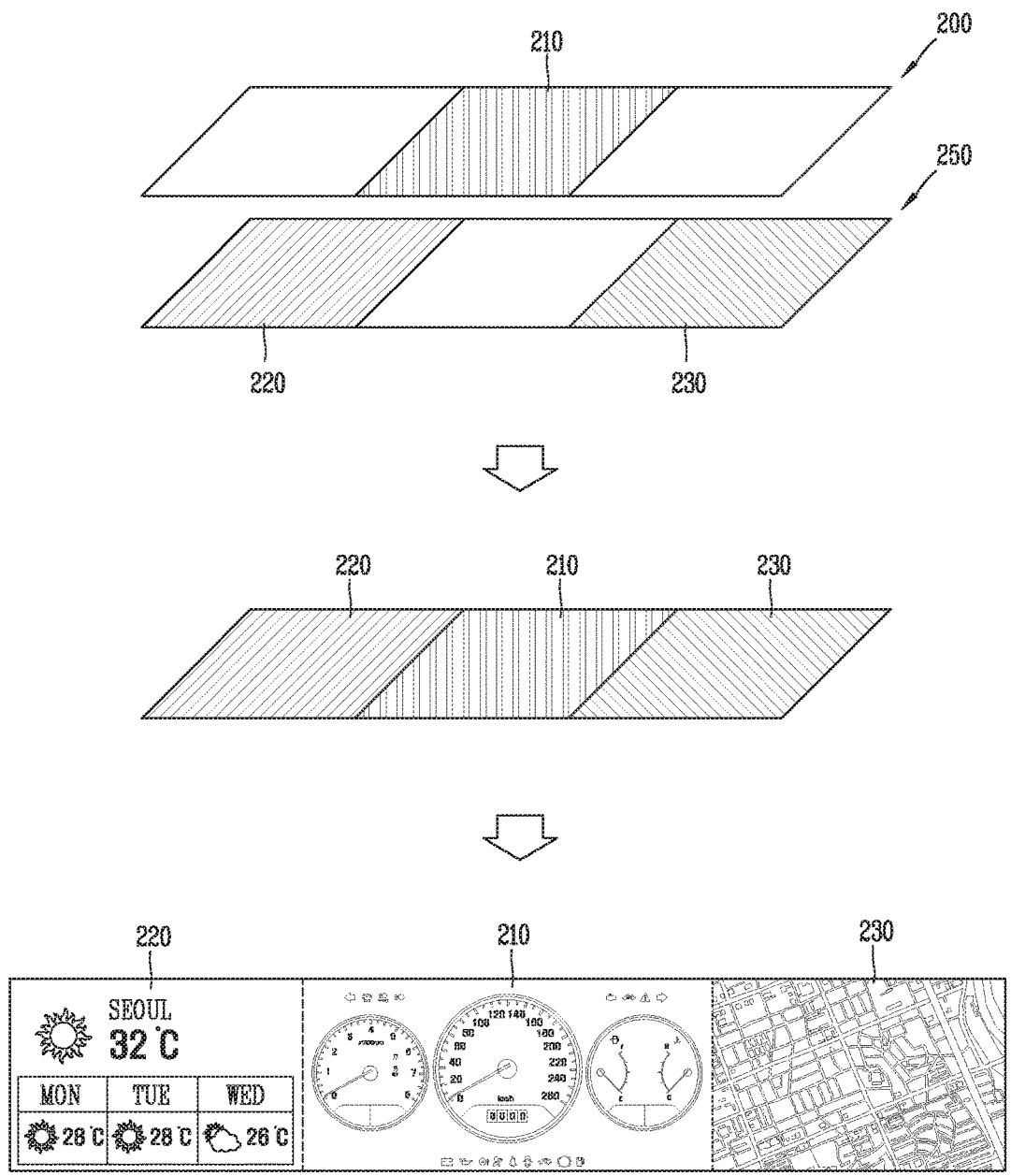
FIG. 2 is an exemplary view illustrating an example in which areas where image information according to a plurality of operating systems are displayed are formed on a touch screen in a vehicle control device according to an embodiment of the present invention.

FIG. 2 is an exemplary view showing an example in which areas in which image information according to a plurality of operating systems is displayed are formed on a touch screen in the vehicle control device according to the embodiment of the present invention.

In FIG. 2, it is assumed that the vehicle control device 100 according to the embodiment of the present invention is driven by two operating system programs (first operating system 181 and second operating system 182) installed in the controller 180. When driven by the two operating system programs, a first layer 200 corresponding to each operating system program, i.e., the first operating system 181, and a second layer 200 corresponding to the second operating system 182 may be formed on the display unit 150. Also, the first layer 200 and the second layer 250 may form a cluster area 210 in which the first operating system 181 displays image information and a cluster area 210 in which the second operating system 182 displays at least one Information areas 220 and 230. The infotainment areas 220 and 230 may be areas for displaying image information related to different functions. The first diagram of FIG. 2 shows an example.

On the other hand, when the cluster area 210 and the infotainment areas 220 and 230 are formed as shown in the first drawing of FIG. 2, the controller 180 may the layers 200 and 250 in an overlapping manner. In this case, the layers 200 and 250 may be superimposed on each other and displayed on the display unit 150 as shown in a second drawing of FIG. 2, so that the cluster area 210 and the infotainment areas 220, and 230 may be formed in different areas on the display unit 150.

Accordingly, as shown in a third diagram of FIG. 2, the first operating system 181 may display information related to a main state and function of the vehicle such as a speed of the vehicle, an RPM value of an engine, and a state of fuel in the cluster area 210 formed at a central portion on the display unit 150. Also, the second operating system 182 may display image information related to infotainment functions provided for user convenience such as navigation information or weather information using the infotainment areas 220 and 230.

Meanwhile, in FIG. 2, it is assumed that the vehicle control device 100 according to an embodiment of the present invention is driven by two operating system programs, and thus, image information according to the two operating system programs is displayed through a plurality of layers. However, it is needless to say that the present invention is not limited thereto and more operating system programs may be driven. Also, at least one of the operating system programs may be an operating system program for controlling functions related to driving and controlling of the vehicle and the remaining at least one other operating system program may be an operating system capable of providing various functions provided for user convenience.

Also, a larger number of layers and areas in which image information corresponding to more functions is displayed may be formed according to the number of operating system programs implemented in the controller 180. That is, in the above description, the first and second operating systems 181 and 182 are implemented and the first operating system 181 display image information in the cluster area 210 and the second operating system 182 displays image information in the first and second infotainment areas 181 and 182, for example, but the vehicle control device 100 according to the embodiment of the present invention may further include a third operating system (not shown) for controlling other additional functions and the first, second, and third operating systems may display image information related to different functions in the cluster area 210, the first infotainment area 220, and the second infotainment area 230, respectively.

In the above description, the cluster area 210 and the two infotainment areas 220 and 230 are formed on the touch screen 150. However, a larger number of infotainment areas or cluster areas may be formed.

However, in the following description, as described in FIG. 2, for the sake of convenience of explanation, it is assumed that the vehicle control device 100 has the first and second operating systems and the first and second operating systems respectively control functions related to driving and controlling of the vehicle (first operating system) and control functions provided for user convenience (second operating system). Also, it is assumed that image information according to functions managed by the first and second operating systems is displayed in the cluster area 210 and the infotainment areas 220 and 230, respectively.

Hereinafter, embodiments related to a control method that may be implemented in the vehicle control device 100 configured as described above will be described with reference to the accompanying drawings. It will be apparent to those skilled in the art that the present invention may be embodied in other specific forms without departing from the spirit or essential characteristics thereof.

FIG. 3 is a flowchart illustrating an operation process of displaying image information related to a plurality of operating systems in a vehicle control device according to an embodiment of the present invention.

Referring to FIG. 3, the controller 180 of the vehicle control device 100 according to the embodiment of the present invention may detect a state of the vehicle or an input of the user when the vehicle starts driving (S300). Here, a detected state of the vehicle may be at least one of a speed of the vehicle, a position of the vehicle, and an environment inside or outside the vehicle.

For example, when the vehicle starts driving, the controller 180 can detect the number of occupants present on the vehicle, a current speed of the vehicle, or a state of a gear set according to a user's operation. Or, the controller 180 may detect a current location of the vehicle and geographical features or characteristics of an area according to the current location of the vehicle. The controller 180 can detect whether the vehicle is currently traveling in an off-road area or an on-road area, and if the vehicle is traveling in an on-road area, the controller 180 may determine whether the vehicle is traveling in a city area or whether it is traveling in a highway area. Further, the controller 180 may detect whether a predetermined amount of vehicles or other objects are not present (e.g., a quiet state) or not on the road in which the vehicle is currently driving on the basis of a result of detecting other vehicles or other objects in the vicinity of the vehicle through sensors provided in the sensing unit 140.

Meanwhile, the vehicle control device 100 may be driven in a specific operation mode according to a detection result of step S300. The operation mode may be any one of a plurality of operation modes previously set to correspond to the detection result of step S300 by a previous test, or the like. Here, the test may be related to a relationship between the detection result of step S300 and the occupant safety, such as the speed of the vehicle, the area where the vehicle is currently traveling, and the number of occupants present in the vehicle, and the like.

On the other hand, the operation mode may mean a state in which at least one different function is provided by at least one operating system program which is different from each other. Or, the operation mode may be an operation mode restricting a user's touch input regarding at least one of the image information display areas (for example, the cluster area 210 or the infotainment areas 220 and 230) formed on the touch screen 150. That is, for example, in a specific operation mode, the user's touch input in both the cluster area 210 and the infotainment areas 220 and 230 may be restricted, but in other operation modes, the user's touch input may be restricted only in at least one of the cluster area 210 and the infotainment areas 220 and 230.

For example, the controller 180 may operate in an operation mode in which only functions provided from any one of the operating system programs, that is, the first operating system 181, are provided according to the detection result in step S300. In this case, only the image information related to the functions provided in the first operating system 181 may be displayed in the entire area of the touch screen 150. That is, only the image information of the functions related to driving and controlling of the vehicle may be displayed on the touch screen 150.

Or as shown in a third drawing of FIG. 2, the controller 180 may operate in an operation mode in which all the functions provided in the first operating system 181 and the second operating system 182 are provided according to the detection result of step S300. In this case, the image information related to the functions provided in the first operating system 181 and the second operating system 182 may be displayed in the cluster area 210 and the infotainment areas 220 and 230 formed on the touch screen 150.

Accordingly, the controller 180 may select at least one operating system to display the image information among the plurality of operating systems based on the detection result of step S300 (S302). The controller 180 may divide the touch screen 150 into at least one area so that the image information on the functions provided by the at least one selected operating system program may be displayed on the touch screen 150 (S304). Accordingly, the touch screen 150 may be divided into the cluster region 210 alone or into the cluster region 210 and at least one infotainment region.

Meanwhile, when at least one area for displaying image information is formed on the touch screen 150, the controller 180 may control the touch screen 150 to display image information related to the functions to be controlled by the respective operating system programs in the formed regions (S306). Accordingly, the image information related to the functions driven in the plurality of different operating system programs may be displayed in different areas on the touch screen 150. Also, the operating system programs may be independently driven as described above, so that a function and an operating state of any one operating system program may not affect any other operating system. That is, although any one of the operating systems is initialized, the other operating systems may be driven regardless thereof, so that the image information of each region on the touch screen 150 can also be displayed independently from each other.

Therefore, even if the image information displayed in the infotainment areas 220 and 230 is turned off due to initialization owing to an operation state error of the second operating system 182, the image information displayed in the cluster area 210 (Image information associated with the functions provided in the first operating system 181) can still display image information regardless thereof.

In the above description, it is assumed that a specific operation mode is selected according to the detection result of step S300 and at least one operating system and image information displayed on the touch screen 150 are determined. However, the present invention is not limited thereto. In other words, the controller 180 can select a specific operation mode according to a user selection as well as the result of sensing the vehicle state in step S300. That is, the controller 180 may cause the vehicle control device 100 to be driven in a specific operation mode based on a user input such as a user's touch, gesture, or a voice, and the image information according to the specific operation mode may be displayed on the touch screen 150.

Meanwhile, as described above, the plurality of operating system programs provided in the vehicle control device 100 according to the embodiment of the present invention are independently operated from each other, and the image information displayed by each operating system program may not affect each other, but an operating system program that operates normally can more effectively use an area on the touch screen 150 where image information is not displayed according to whether or not an operating system program in operation is abnormal.

FIG. 4 is a flow chart illustrating an operation process of the vehicle control device 100 according to the embodiment of the present invention.

Referring to FIG. 4, the controller 180 of the vehicle control device 100 according to the embodiment of the present invention may detect whether the currently driven operating systems have an error in a state that image information related to functions controlled in each operating system program is displayed (step S306) on the touch screen 150 (S400). For example, unlike the first operating system 181, which is designed to meet automobile safety integrity standards such as, for example, ISO 26262 and the automotive safety standard, such as ASIL-B, the second operating system 182 including various functions to provide user convenience may have low stability and reliability level. That is, compared to the first operating system 181, the second operating system 182 can provide a variety of functions, but there is a high possibility that an error may occur.

Meanwhile, if there is an operating system in which an error has occurred among the currently driven operating systems in step S400, the controller 180 may perform recovery of the operating system program in which the error occurred, and while the recovery is performed, an operating system program that operates normally may control an area on the touch screen 150 which is controlled by the operating system program with the error (S402). Accordingly, the image information on the functions provided by the operating system program that operates normally may be displayed in the area on the touch screen 150 where the image information of the operating system program with the error is displayed (S404).

That is, when the vehicle control device 100 according to the embodiment of the present invention is implemented as in the above-described assumption, if an error occurs in the second operating system 182, the controller 180 may enable the first operating system 181 without an error to control an area on the touch screen 150 which is controlled by the second operating system 182. Then, the first operating system 181 can control not only the cluster area 210 but also the infotainment areas 220 and 230 and the image information related to the functions controlled by the first operating system 181 may be displayed in the entire area of the touch screen 150.

Here, the image information displayed in the infotainment areas 220 and 230 may be related to functions different from those of the image information provided in the cluster area 210. That is, a operating system program which normally operates may display image information related to more functions than currently provided functions by utilizing an area in which image information of the operating system program with an error is displayed.

Meanwhile, the controller 180 can detect whether the recovery of the operating system program with the error is completed (S406). Here, the state where the recovery of the operating system program is completed may indicate whether or not the function which was performed before the error occurred may be performed subsequently. If it is determined in step S406 that the recovery is completed, the controller 180 may display the image information corresponding to the currently recovered operating system program and the operating system program which normally operates in the different operating areas (S408).

The configuration and operation of the vehicle control device 100 according to the embodiment of the present invention have been described in detail with reference to block diagrams and flow charts.

In the following description, an example in which image information according to a plurality of operating system programs is displayed in different areas of the touch screen 150 and an example in which displayed image information is changed according to a user selection, a detected state of the vehicle, or an operation state of another operating system, in the vehicle control device 100 according to the embodiment of the present invention, will be described in detail with reference to the drawings.

FIGS. 5A to 5D illustrate examples in which different image information is displayed on the touch screen according to each operation mode in the vehicle control device according to the embodiment of the present invention.

Figure 5A:
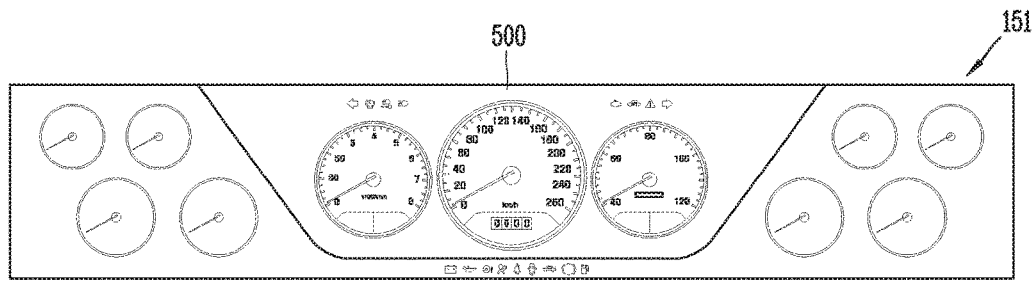
FIGS. 5A to 5D are exemplary views showing examples in which image information about functions managed in at least one operating system is displayed on a touch screen, in the vehicle control device according to the embodiment of the present invention.
Figure 5B:
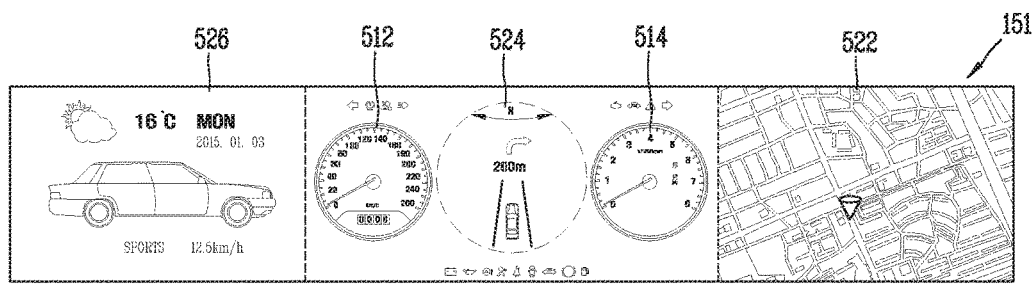

First, referring to FIG. 5A, FIG. 5A shows an example in which information related to control and driving of the vehicle is displayed on the entire area on the touch screen 150. That is, in the example shown in FIG. 2, the cluster region 210 and the infotainment regions 220 and 230 are formed on the left and right sides of the cluster region 210 on the touch screen 150, but FIG. 5A shows an example in which information related to control and driving of the vehicle is displayed not only in the cluster region 210 but also in the infotainment regions 220 and 230.

FIG. 5A shows an example of a screen of the touch screen 150 when the information related to the control and driving of the vehicle is operated in an operation mode for displaying more detailed information. Such an operation mode may be set when the safety of an occupant is given priority over convenience. For example, when the vehicle is traveling at a speed higher than a predetermined speed, the vehicle control device 100 according to the embodiment of the present invention may display only the image information 500 related to driving and controlling of the vehicle on the touch screen 150 as shown in FIG. 5A. Hereinafter, an operation mode in which only the image information related to the control and driving of the vehicle is displayed will be referred to as a racing mode.

When the vehicle control device is driven in the racing mode as described above, only the first operating system 181 for controlling the functions related to the control and driving of the vehicle may display the image information on the touch screen 150. Then, as shown in FIG. 5A, the first operating system 181 can display the image information on the entire area of the touch screen 150 and can restrict a user's touch input from the entire area of the touch screen 150 so that the user may concentrate on driving.

On the other hand, the vehicle control device 100 according to the embodiment of the present invention may be driven in a specific operation mode based on not only a speed of the vehicle but also the result of detecting a position of the vehicle or a surrounding state of the vehicle. For example, the controller 180 may be driven in an operation mode in which the image information related to the predetermined functions is displayed in the infotainment areas 220 and 230 based on the detection result.

For example, when the vehicle is traveling in an off-road region or according to a weather situation in which it rains or snows by a predetermined amount or greater, or according to a current time or sensed intensity of illumination surrounding the vehicle as a result of detecting the current position of the vehicle, the controller 180 may display information on the current position of the vehicle, information on the route, and information on the current time or the surrounding weather on the touch screen 150 in addition to the functions related to driving and controlling of the vehicle.

Hereinafter, an operation mode in which the image information 522 and 524 related to the function of displaying the position and the route of the vehicle and the information 526 such as the current time and the weather, in addition to the information 512 and 514 related to the driving and controlling of the vehicle, will be referred to as a sports mode.

On the other hand, when the vehicle control device is driven in the sports mode, the information 512 and 514 related to the driving and controlling of the vehicle may be information displayed under the control of the first operating system 181, and the information 522, 524, and 526 on the position and route of the vehicle and time and weather may be information displayed under the control of the second operating system 182. Meanwhile, the first and second operating systems 181 and 182 may restrict a user's touch input for each region in which the image information is displayed so that the user can focus more on the operation.

In addition, the functions provided in the sports mode and the displayed image information may be changed in advance according to a user selection.

Meanwhile, the vehicle control device 100 according to the embodiment of the present invention may be driven in various operation modes in addition to the racing mode and the sports mode. In addition, the racing mode and the sports mode described above may provide a mode capable of providing various functions according to a touch input of the user, unlike the case where the user's touch input is limited for the safety of the occupant. For example, when the speed of the vehicle is less than a predetermined level and the vehicle is in operation in a relatively stable driving area, such as a city area, the controller 180 may detect the touch input of the user operate in an operation mode for performing a specific function. In this case, the controller 180 may display image information related to the function executed in accordance with the touch input in a partial area of the touch screen 150, and FIGS. 5C and 5D show such an example.

Figure 5C:
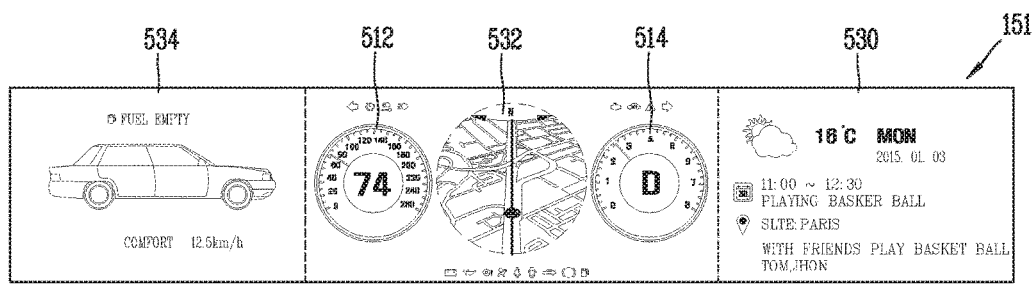

FIG. 5C shows an example in which when a specific function according to a use selection is executed, corresponding image information is displayed on a partial area of the touch screen 150. In FIG. 5C, it is assumed that the function selected by the user is a schedule management function. As shown in FIG. 5C, the controller 180 displays information 530 related to the schedule of the user in a partial area on the touch screen 150.

In this case, the information 512 and 514 related to the driving and controlling of the vehicle displayed under the control of the first operating system 181 and information 532 and 534 on the route and state of the vehicle displayed under the control of the second operating system 182, and information 530 according to the function selected by the user may be displayed under the control of the second operating system 182 on the touch screen 150. Here, the information 530 according to the function selected by the user may be displayed under the control of a third operating system (not shown) different from the first and second operating systems 181 and 182.

Figure 5D:
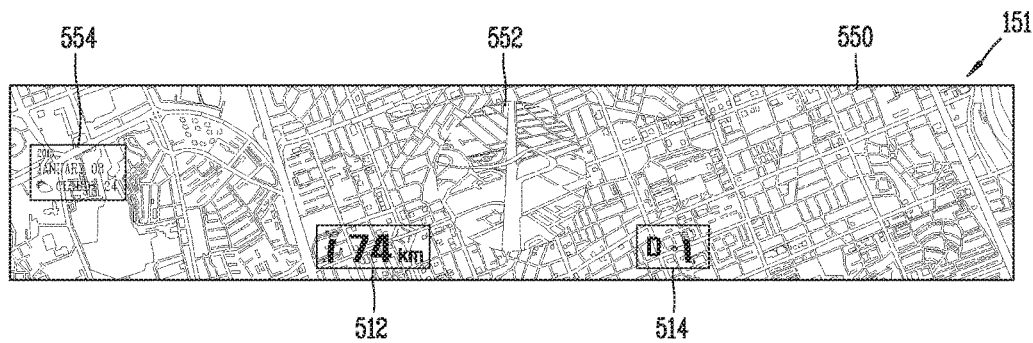

On the other hand, while FIG. 5C shows a case that a user input in a certain area on the touch screen 150 is detected and image information related to the function executed accordingly is displayed, FIG. 5D shows an example based on an assumption that a function selected by the user is a navigation function, and the controller 180 may display image information related to the function selected by the user, that is, the navigation function, in the entire area of the touch screen 150. In this case, the image information 550 and 552 related to the navigation function may be displayed by the second operating system 182 or the third operating system (not shown).

As illustrated in FIG. 5D, although the image information according to the function selected by the user is displayed on the entire touch screen 150, the image information 512 and 514 displayed in the first operating system 181 may be displayed on the touch screen 150. This is because the image information related to the functions controlled by the first operating system 181 is related to the driving and controlling of the vehicle and must be displayed.

Also, as illustrated in FIG. 5D, when the image information according to the function selected by the user is displayed in the entire area of the touch screen 150, the controller 180 may detect a user's input in the entire area of the touch screen 150. In this case, as shown in FIG. 5D, in some areas of the touch screen 151, image information 554 according to the user's touch input may be displayed.

On the other hand, the operation modes for displaying the image information as shown in FIGS. 5C and 5D may be determined by various requirements. That is, as described above, when a speed of the vehicle is less than a predetermined level and the vehicle is in operation in a relatively stable running area, the controller 100 may be driven in any one of the operation modes on the basis of the number of occupants, the presence or absence of a neighbor vehicle or an obstacle around the vehicle. Or the vehicle control device 100 according to the embodiment of the present invention may be driven in any one of the specific operation modes selected according to a user input.

Meanwhile, as described above, according to the present invention, the image information related to the functions managed by at least one operating system program is displayed in different areas of the touch screen 150 according to the selected operation mode. In this case, the controller 180 may change the areas where the image information is displayed according to a user selection.

Figure 6A:
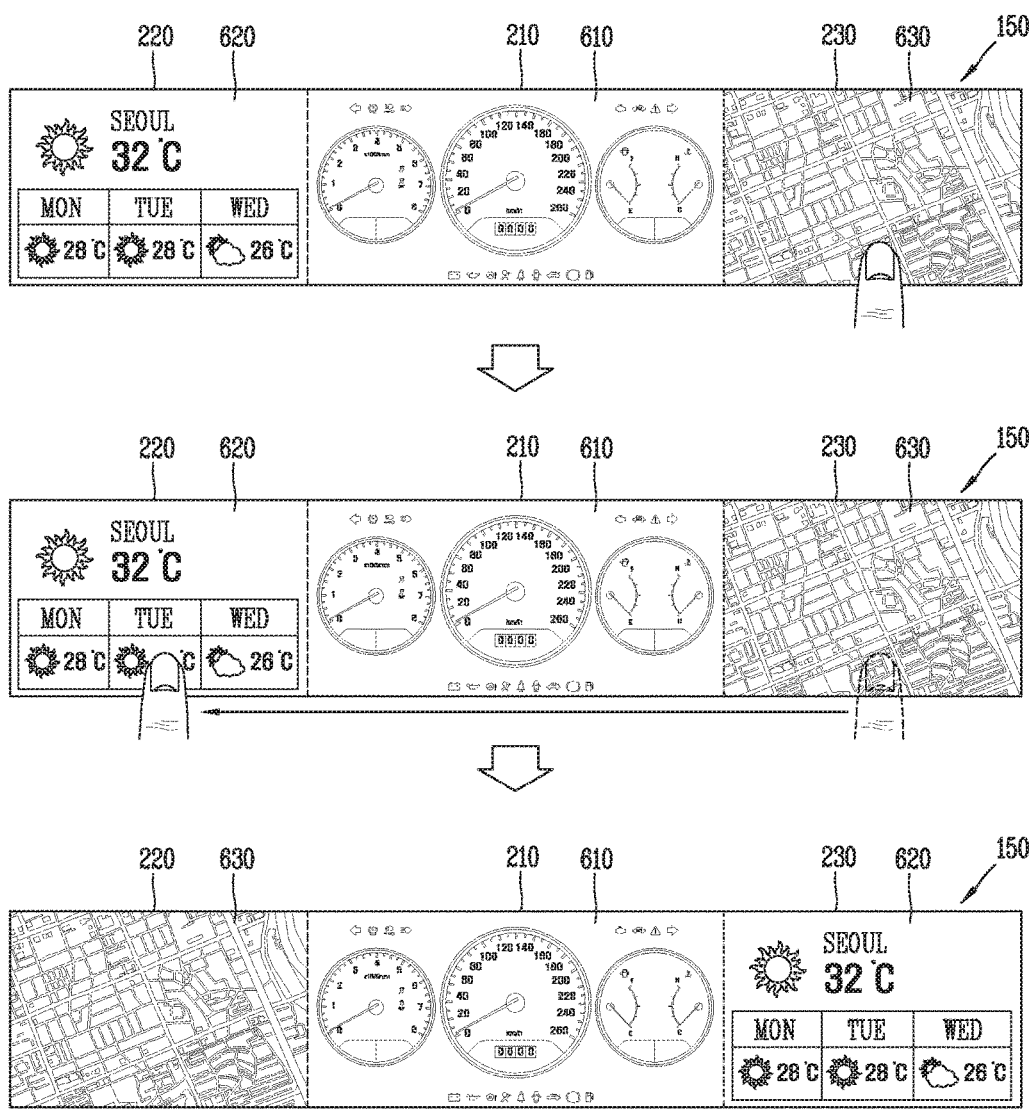
FIGS. 6A and 6B are views illustrating examples in which an area where image information is displayed is changed according to a user's selection, in the vehicle control device according to an embodiment of the present invention.
Figure 6B:
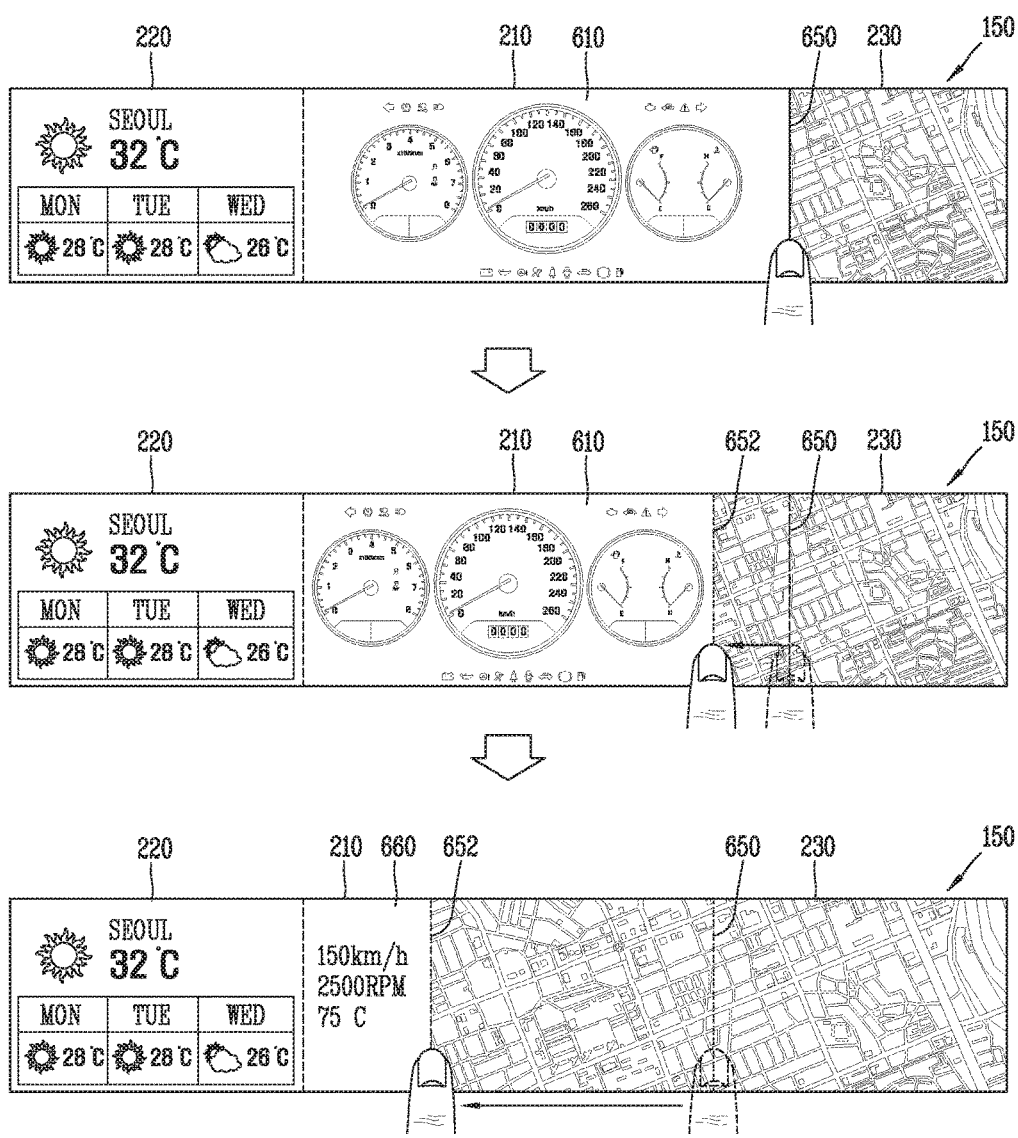

FIGS. 6A and 6B illustrate examples in which, in the vehicle control device 100 according to the embodiment of the present invention, an area where the image information is displayed is changed according to a user selection. For the sake of convenience, as illustrated in FIG. 2, it is assumed that a cluster region 210 is formed at the center of the touch screen 150 and the infotainment regions 220 and 230 are formed on the left and right sides of the touch screen 150, respectively. However, the present invention is not limited thereto as shown in FIGS. 5A to 5D.

First, referring to FIG. 6A, FIG. 6A shows an example in which a position of an area in which image information is displayed is changed according to a user selection.

For example, as shown in FIG. 6A, in a state that information 610 related to driving and controlling the vehicle is displayed in the cluster area 210 and weather information 620 and information 630 related to a current position of the vehicle are respectively displayed in the left and right infotainment areas 220 and 230, when the user selects information of a specific area, the controller 180 may determine that the input is a user input for changing a position of the information displayed in the corresponding area. For example, the controller 180 may determine it on the basis of a duration of the touch input applied to the specific area and pressure applied to the touch input. In this case, the controller 180 may determine that the vehicle position information 630 is currently selected based on the state of the touch input.

In this state, as shown in a second drawing of FIG. 6A, when the user applies a drag input from the point on the touch screen 150 to which the current touch input is applied to the area 220 where the weather information 620 is displayed, the controller 180 can determine that the drag input is for changing the position of the displayed image information. Thus, the controller 180 may move the position information 630 of the vehicle to the first infotainment area 220 in accordance with the drag input and move the image information displayed in the first infotainment area 220, that is, the weather information 520*m*, to the second infotainment area 230. A third drawing of FIG. 6A illustrates this state.

Meanwhile, a size of an area where image information is displayed, as well as the position where the screen information is displayed, may be changed. That is, as shown in the first drawing of FIG. 6B, the controller 180 can determine whether to change the image information display area on the basis of a position where a touch input is applied on the touch screen 150. That is, as illustrated in a first drawing of FIG. 6B, when a touch input is applied to one point on the touch screen 150 corresponding to a boundary between the second infotainment region 220 and the cluster region 210, the controller 180 may determine that the touch input is for changing the area in which the image information is displayed in the second infotainment area 220 and the cluster area 210. Alternatively, the controller 180 may determine it based on a duration of the touch input and pressure applied to the touch input.

On the other hand, when it is determined that the touch input of the user is to change the area in which the image information is displayed, the controller 180 may change a size of the second infotainment area 220 and the cluster are 210 according to a drag input applied after the touch input. That is, as shown in a second drawing of FIG. 6B, when the size of the second infotainment area 220 increases according to a drag input of the user, the controller 180 may display more information in the second infotainment area 220. That is, as shown in FIG. 6B, if map information is displayed in the second infotainment area 220, the controller 180 can display the map information of A larger area in the second infotainment area 220.

Conversely, a narrower cluster region 210 may change the image information displayed according to the area on the narrowed touch screen 150. That is, as shown in a third drawing of FIG. 6B, the controller 180 may change the information related to the driving and controlling of the vehicle displayed in the form of an analog type instrument panel into a digital type represented by numbers and letters and display the same on the display unit 210.

Meanwhile, in the above description, the infotainment area is enlarged according to a touch input of the user and the cluster area is reduced accordingly. However, the opposite case may also occur. When a size of the cluster area increases by a predetermined level or more, information which was not displayed in the cluster area before the change may be further displayed. That is, if only a speed of the vehicle and RPM information of the engine are displayed in the cluster area before the area is changed, more information about a state of fuel and a temperature of a coolant may be further displayed in the cluster area with a size increased by a preset level or greater.

On the other hand, according to the above description, the vehicle control device 100 according to the embodiment of the present invention can share at least one area of the memory 170 and can simultaneously use the stored information stored in the shared area as mentioned above.

Figure 7:
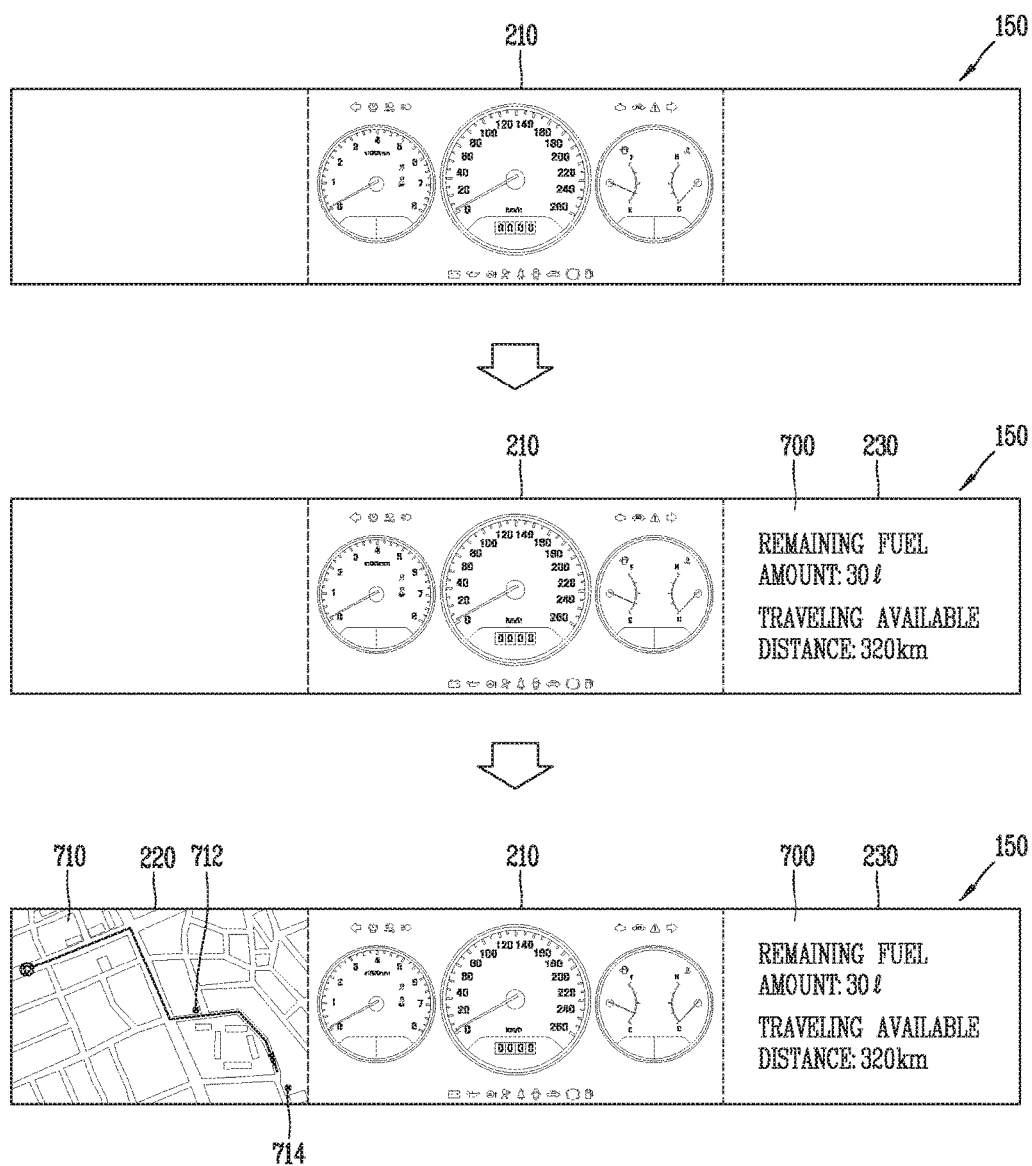
FIG. 7 is a view illustrating an example in which a plurality of operating systems share information sensed from a vehicle and display different image information related thereto in a vehicle control device according to the embodiment of the present invention.

FIG. 7 is an exemplary view showing an example in which information detected from the vehicle is shared by a plurality of operating systems and display different related image information in the vehicle control device 100 according to the embodiment of the present invention. For convenience of explanation, a case that different operating system programs share information on a fuel state of the vehicle will be described as an example. An example in which the first operating system 181 senses information on the fuel state of the vehicle and the second operating system 182 shares the information sensed by the first operating system 181 so that a first function and a second function are utilized by turns will be described by stages through three drawings.

First, FIG. 7 shows an example in which a fuel state of the vehicle is detected under the control of the first operating system 181 together with various states of the vehicle as described above. In this case, information on the detected fuel state and various states of the vehicle may be displayed in the cluster area 210 on the touch screen 150 controlled by the first operating system 181.

In this state, the state information of the vehicle detected under the control of the first operating system 181 may be stored in the memory 170. In this case, the area of the memory 170 in which the state information of the vehicle is stored may be an area shared with the second operating system 182. The sharing of the memory 170 between the different operating system programs may be implemented by a predetermined driver program. For example, the different operating system programs can input and output information on the detected state of the vehicle to and from the memory 170 through the driver program, thereby sharing information among the different operating system programs.

Accordingly, the second operating system 182 may share the detected state information of the vehicle with the first operating system 181. Also, the second operating system 182 may further provide other information related to the shared information. For example, the second operating system 182 may display a remaining amount of fuel in letters or numbers and calculate and display a distance available to travel based on the remaining fuel, so that the user can more easily recognize the remaining amount of fuel (first function). A second drawing of FIG. 7 shows an example in which the second operating system 182 displays the image information 700 related to the first function in the second infotainment area 230.

On the other hand, in this state, if an amount of remaining fuel is less than a predetermined level, or if the travelable distance is less than a preset distance, the second operating system 182 may display information on a gas station positioned within a travelable distance from the current position of the vehicle (second function). A third drawing of FIG. 7 shows an example in which map information including positions 712 and 714 of gas stations located within the travelable distance is displayed as image information 710 related to the second function in the first infotainment area 220.

Figure 8:
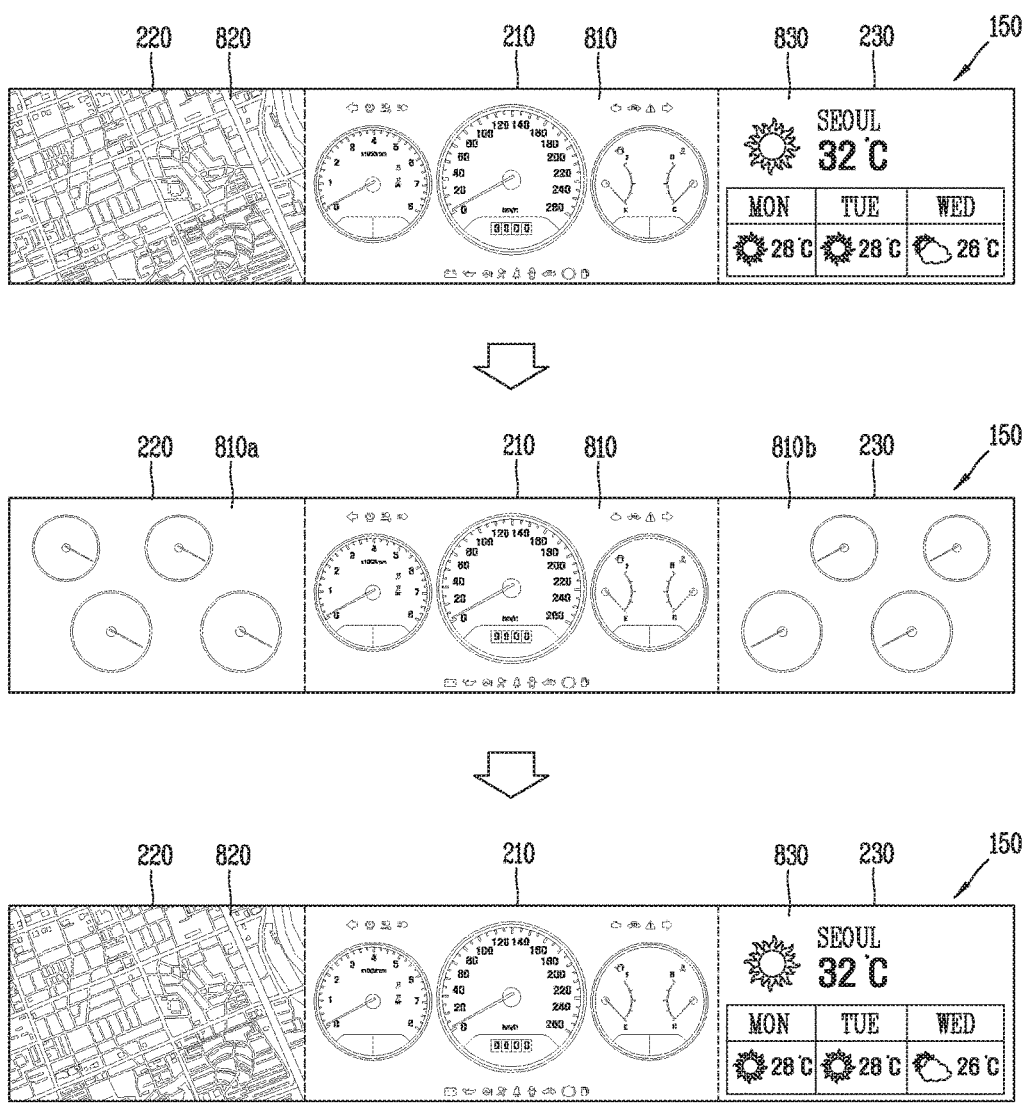
FIG. 8 is a view showing an example in which image information of an operating system which normally operates in an area of a touch screen on which image information of the operating system in which an error has occurred is displayed, in the vehicle control device according to the embodiment of the present invention.

Meanwhile, according to the above description, the vehicle control device 100 according to the embodiment of the present invention is configured such that image information according to an operating system program which normally operates may be displayed on the touch screen 150 on which image information according to an operating system program in which an error occurs. FIG. 8 shows an example of such a case.

Referring to FIG. 8, first, a first drawing of FIG. 8 shows an example in which the image information 810 related to driving and controlling of the vehicle is displayed in the cluster area 210 according to the first operating system 181 and position information of the vehicle and weather information are displayed in the first infotainment area 220 and the second infotainment area 230 according to the second operating system 182, respectively.

In this state, if an error occurs in the second operating system 182, the controller 180 can initialize the second operating system 182 and recover the same. In this case, while the second operating system 182 is being restored, the controller 180 may enable the first operating system 181 which normally operates to control the areas of the touch screen 150 controlled by the second operating system 182, that is, the first and second infotainment areas 220 and 230.

In this case, as illustrated in a second drawing of FIG. 8, the first operating system 181 may display image information related to functions controlled by the first operating system 181 in the first and second infotainment regions 220 and 230. Here, as illustrated in a second drawing, the first operating system 181 may display information, which is not displayed in the cluster area 210, in the first and second infotainment areas 220 and 230. Alternatively, the first operating system 181 may display a predetermined image in the first and second infotainment areas 220 and 230. Alternatively, the first operating system 181 may display information displayed in the cluster area 210 in a larger size using the first and second infotainment areas 220 and 230.

When recovery of the second operating system 182 is completed in this state, the controller 180 may display position information of the vehicle and weather information in the first infotainment area 220 and the second infotainment area 230 according to the second operating system 182 again. A third drawing of FIG. 8 shows this example.

Meanwhile, the vehicle control device 100 according to an embodiment of the present invention may be connected to various peripheral devices such as a mobile terminal and provide a function corresponding thereto. In this case, the function associated with the mobile terminal may be included as a function provided by any one of functions provided by the second operating system 182 or a function provided by the third operating system, and related image information may be displayed in the area of the touch screen 150 controlled by the second operating system 182, for example, the first infotainment area 220 or the second infotainment area 230. Here, the third operating system may be a separate operating system program implemented to provide the function associated with the mobile terminal.

Figure 9:
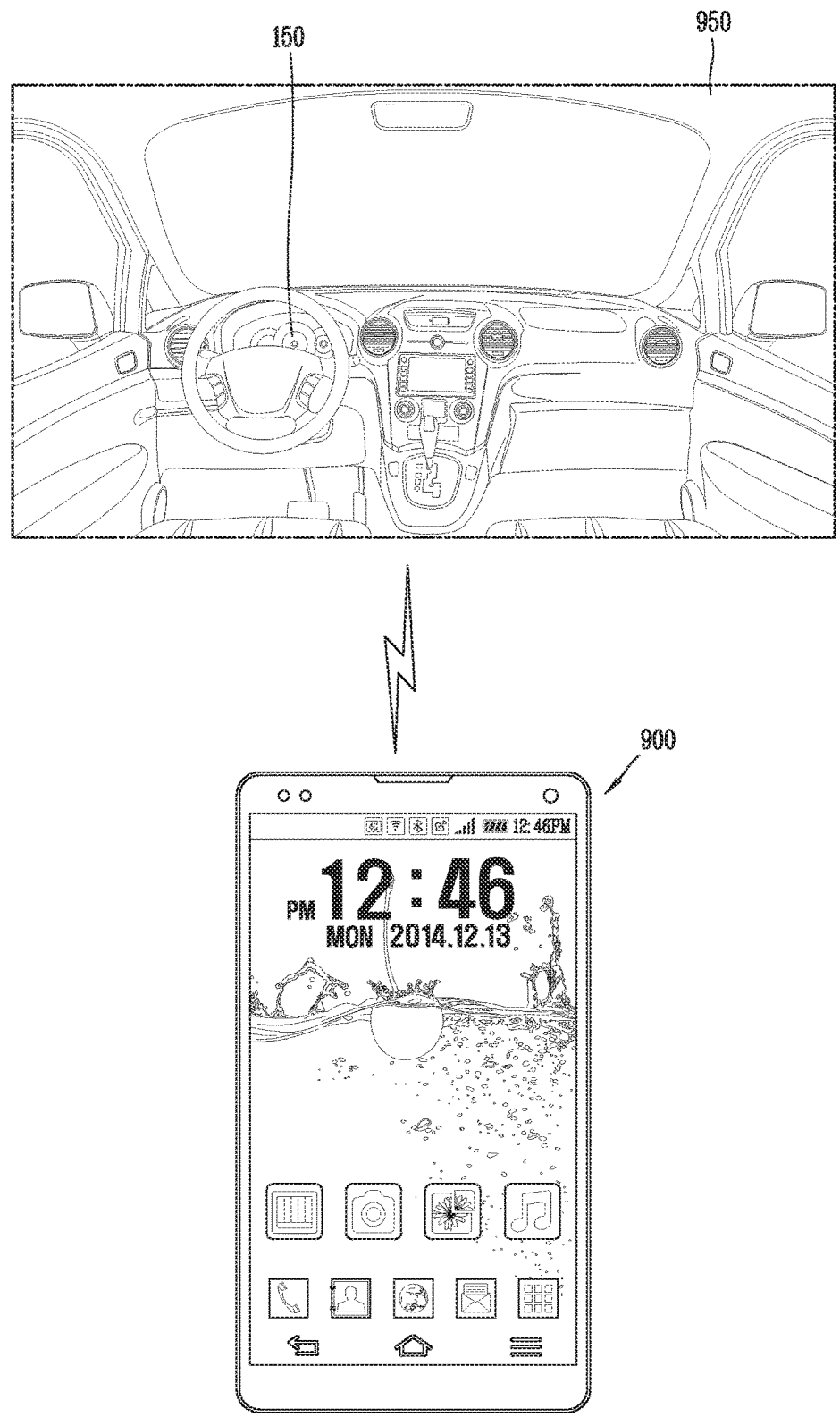
FIG. 9 is a view showing an example in which a vehicle control device according to the embodiment of the present invention is connected to a mobile terminal.

FIG. 9 is an exemplary view showing an example in which the vehicle control device according to the embodiment of the present invention is connected to a mobile terminal in such a case.

Referring to FIG. 9, FIG. 9 shows an example in which a mobile terminal 900 of the user is wirelessly connected to a controller (not shown) of the vehicle. Such a mobile terminal may include a notebook computer, a personal digital assistant (PDA), a navigation device, a slate PC, a tablet PC, a wearable device (e.g., a smart watch, a smart glass, a head mounted display (HMD)), and the like, as well as a smartphone as shown in FIG. 9. However, in the following description, a mobile terminal in the form of a smartphone will be described as an example for convenience of explanation.

The mobile terminal 900 may be connected to the vehicle controller wiredly or wirelessly, and request the vehicle controller to perform a specific function. A state that the vehicle is connected to the mobile terminal 900 and interworks with the vehicle will be referred to as a 'connected car' hereinafter.

In this manner, in the 'connected car' state, the mobile terminal 900 may transmit image information and/or sound information output from the mobile terminal 900 to an A/V (Audio/Video) output device provided in the vehicle through a predetermined interface. The image information and/or the sound information transmitted to the output device of the vehicle may be output through the touch screen 150 and/or an audio system (not shown) provided in the vehicle. At this time, as the interface unit for transmitting the image information and/or the sound information, a unit supporting wireless communication such as a wireless fidelity (WiFi) transceiver or a Bluetooth transceiver, or a unit supporting wired communication such as a USB (Universal Serial Bus) terminal can also be used.

In the meantime, if the function associated with the mobile terminal 900 is included as any one of functions provided by the second operating system 182 or a function provided by the third operating system, in the 'connected car' state, the mobile terminal 900 may display image information output from a display unit of the mobile terminal 900 through the touch screen 150 provided in the vehicle. Or, image information related to a specific function of the mobile terminal 900 may be displayed through the touch screen 150 provided in the vehicle.

Meanwhile, when the image information related to the specific function of the mobile terminal 900 is displayed through the touch screen 150 provided in the vehicle, the second operating system program 182 may execute a related function. That is, if a function relating to date information is selected by the user from the mobile terminal 900 and image information related to the corresponding function is displayed on the touch screen 150, the second operating system 182 may execute a function corresponding to the received information, i.e., a function related to date information, rather than displaying information received in the mobile terminal 900.

Accordingly, the information related to a schedule of the user, as well as the date information, may be displayed on the touch screen 150 and an operation according to a user input applied to an area on the touch screen 150 on which the image information is displayed may be performed. Also, in this case, a result of performing the operation may be transmitted to the mobile terminal 900 and synchronized with each other.

Figure 10A:
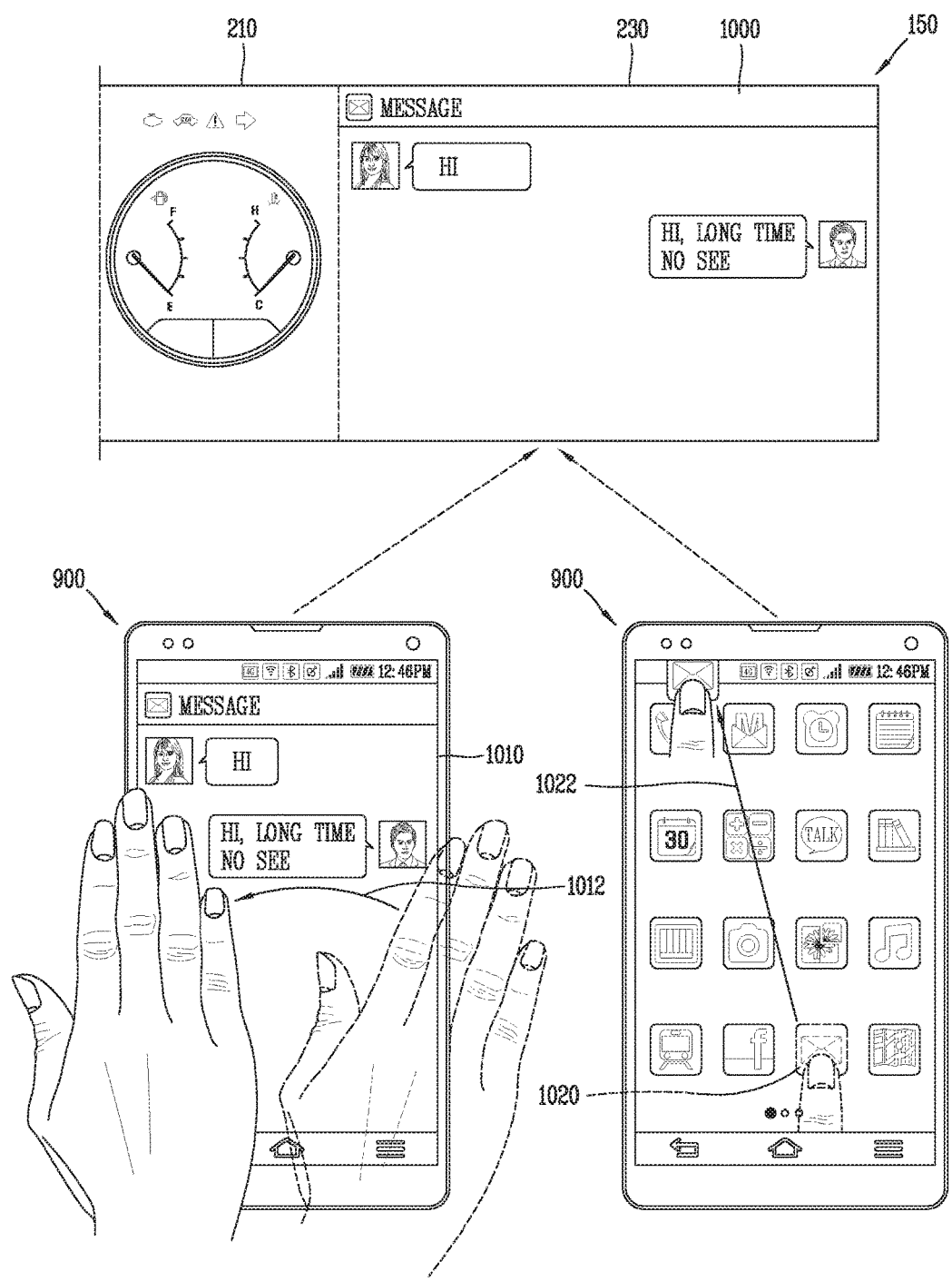
FIGS. 10A to 10C are views illustrating an example in which a vehicle control device and a mobile terminal are interlocked with each other according to an embodiment of the present invention.
Figure 10B:
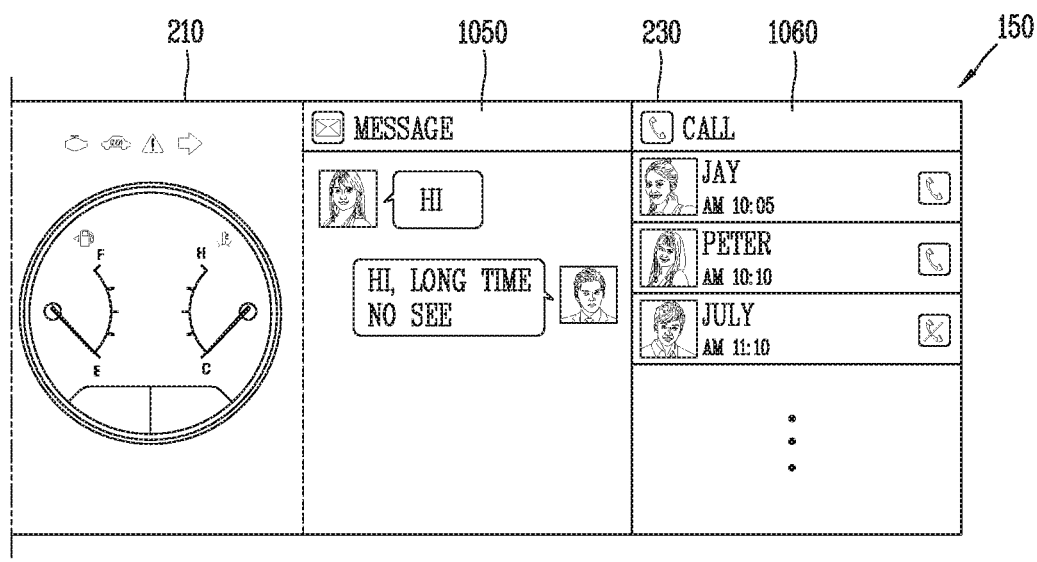
Figure 10C:
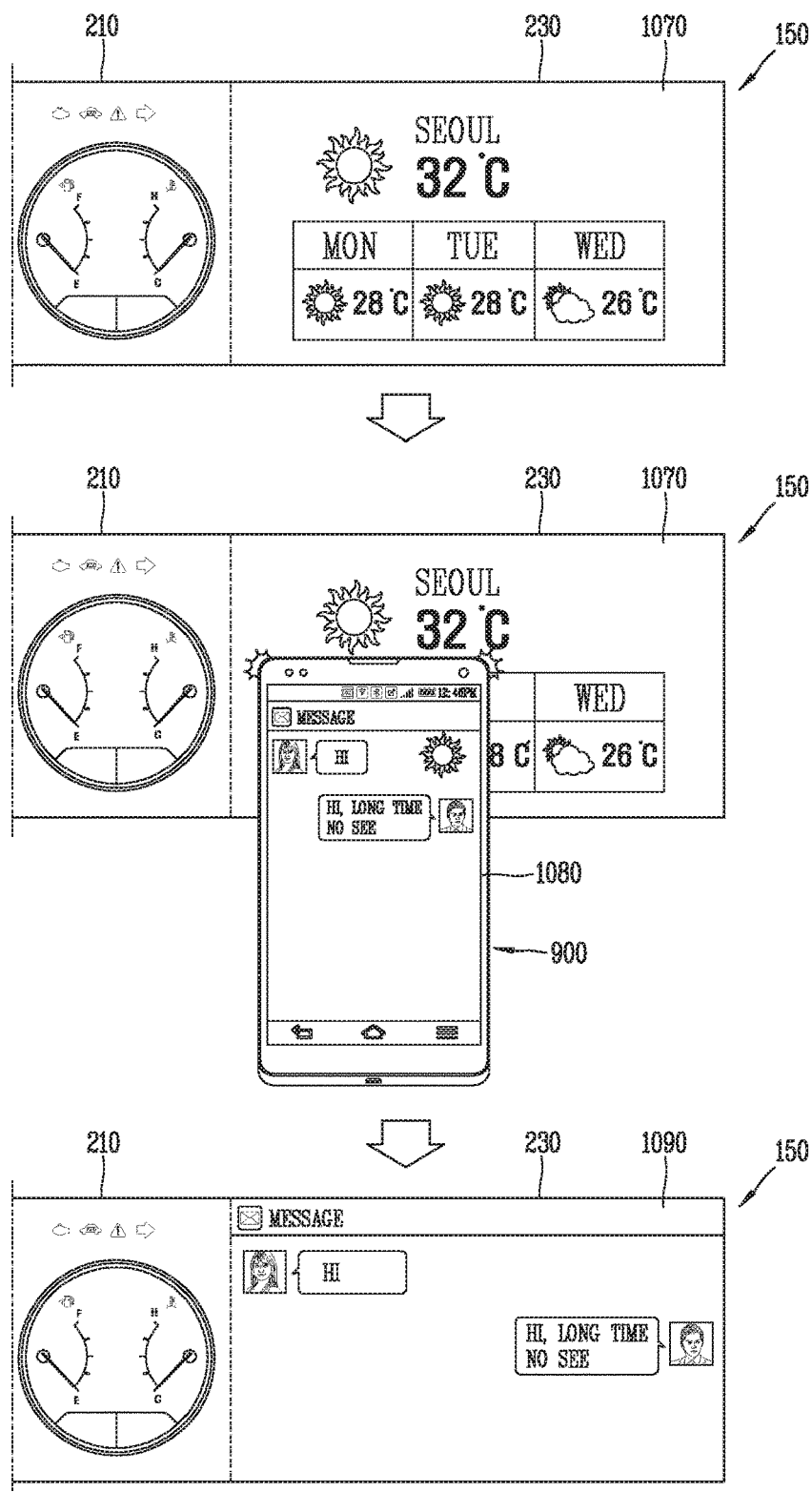

FIGS. 10A to 10C illustrate an example in which when the function associated with the mobile terminal 900 is included as one of functions provided by the second operating system 182, the mobile terminal 900 and the vehicle control device 100 are connected. In the following description, it is assumed that the function associated with the mobile terminal 900 is displayed in a partial area on the touch screen 150 by any one of the functions provided by the second operating system 182 or the third operating system will be described. Also, it is assumed that the partial area on the touch screen 150 is the second infotainment area 230.

First, referring to FIG. 10A, FIG. 10A is a diagram illustrating an example in which image information displayed on the display unit 1010 of the mobile terminal 900 or image information related to any one of the functions which may be provided by the mobile terminal 900 is displayed on a partial area of the touch screen 150 provided in the vehicle control device 100 according to the embodiment. In this case, information of the mobile terminal 900 may be transmitted to the vehicle control device 100 in various ways.

For example, as shown in a second drawing of FIG. 10A, when there is a preset gesture 1012 of the user sweeping the display unit of the mobile terminal 900 in a specific direction, the controller of the mobile terminal 900 may detect the gesture. Also, mage information 1010 currently displayed on the display unit of the mobile terminal 900 may be transmitted to the vehicle control device 100 according to the gesture 1012. Then, as shown in a first drawing of 10A, the second operating system 182 or the third operating system can display the image information received from the mobile terminal 900 in the second infotainment area 230. Accordingly, as shown in the first and second drawings of FIG. 10A, image information 1000 the same as the image information 1010 displayed on the mobile terminal 900 may be displayed in the second infotainment region 230.

It should be noted that the second operating system 182 or the third operating system may display image information related to a specific function of the mobile terminal 900 in the second infotainment area 230 in other manners. For example, as shown in the third drawing in FIG. 10A, when a graphic object corresponding to any one of the functions executable in the mobile terminal 900 is selected by the user and the selected graphic object is dragged at a predetermined distance or greater in a preset direction, the mobile terminal 900 may determine that a function corresponding to the dragged graphic object has been selected by the user.

Then, the controller of the mobile terminal 900 may transmit image information related to the function corresponding to the selected graphic object to the vehicle control device 100. That is, as shown in the third drawing of FIG. 10A, when the user drags a graphic object 1020 corresponding to the 'text message' function on the display unit of the mobile terminal 900 by a predetermined distance or greater, that is, to a screen boundary that may be displayed on the display unit, the controller of the mobile terminal 900 may transmit image information related to the 'text message' function to the vehicle control device 100. Accordingly, as illustrated in the first drawing of FIG. 10A, the second operating system 182 or the third operating system can display the text message transmission/reception history information 1000 in the second infotainment area 230.

Meanwhile, it should be noted that the second operating system 182 or the third operating system may display image information related to at least one function of the mobile terminal 900 in the second infotainment area 230. FIG. 10B shows an example of such a case.

Referring to FIG. 10B, FIG. 10B shows an example in which image information related to different functions of the mobile terminal 900 is displayed in the second infotainment area 230.

For example, in a state that image information 1050 related to a 'text message function' of the mobile terminal 900 is displayed in the second infotainment area 230, when information related to call history is transmitted from the mobile terminal, the second operating system 182 or the third operating system may divide the second infotainment area 230 into two areas. The second operating system 182 or the third operating system may display the image information 1050 related to the 'text message function' and image information 1060 related to the call history in the two divided areas, respectively. Accordingly, in the second infotainment area 230, image information related to at least two or more different functions of the mobile terminals 900 may be simultaneously displayed.

On the other hand, FIG. 10B shows an example in which the second infotainment area 230 is divided into two areas and image information for two different functions of the mobile terminal is displayed in each area. However, the present invention is not limited thereto. That is, the second infotainment area 230 may be divided into two or more areas, and image information related to different functions of the mobile terminal may be displayed. Like the case illustrated in FIGS. 6A and 6B in which a size and a position of the areas formed on the touch screen 150 may be changed according to a user selection, a size and a position of the areas in which each image information is displayed may be changed according to a user selection.

In FIG. 10A, the case that image information related to a specific function of the mobile terminal 900 or a screen displayed on the display unit may be displayed in a preset area of the touch screen 150, that is, an area (e.g., the second infotainment area 230) of the touch screen 150 controlled by the second operating system 182 according to a user input sensed in the mobile terminal 900 is described as an example, but image information according to information received from the mobile terminal 900 may be displayed in a certain point of the touch screen 150 according to a user selection. FIG. 10C shows this example.

Referring to FIG. 10C, a first drawing of FIG. 10C shows an example in which weather information 1070 is displayed in the second infotainment area 230 as a function provided by the second operating system 182. Here, when specific information is received from the mobile terminal 900, the second operating system 182 may display image information according to the received specific information in a part of the area of the touch screen 150. Also, when the first operating system 181 and the second operating system 182 control the cluster area 210 and the first and second infotainment areas 220 and 230 on the touch screen 150, respectively, as shown in FIG. 2, the image information according to the specific information received from the mobile terminal 900 may be displayed in any one of the first and second infotainment areas 220 and 230.

In this state, as shown in a second drawing of FIG. 10C, when contact by the mobile terminal 900 occurs at a certain point on the touch screen 150, the second operating system 182 may detect it. In addition, when such contact occurs, the controller (not shown) of the mobile terminal 900 can also detect it according to a detection result of an acceleration sensor, a touch sensor, or the like.

That is, in the connected car state, when the mobile terminal 900 contacts one point on the touch screen 150 at a certain pressure or speed, the second operating system 182 and the controller of the mobile terminal 900 may sense the contact at the same time.

In this case, the controller of the mobile terminal 900 may determine the contact as a user's input to transmit the information related to the screen displayed on the display unit of the mobile terminal 900 to the second operating system 182. Then, the mobile terminal 900 may transmit the screen related information to the second operating system 182, and the second operating system 182 may display image information corresponding to the information received from the mobile terminal 900 on the touch screen 150.

Here, the second operating system 182 may display image information corresponding to the information received from the mobile terminal 900 at a position where the contact is sensed.

That is, if the contact is sensed at one point of the second infotainment region 230 as shown in the second drawing of FIG. 10C, the second operating system 182 may display image information corresponding to the information received from the mobile terminal 900 in the second infotainment area 230. Therefore, in the present invention, image information displayed on the screen of the mobile terminal 900 may be displayed in a specific area on the touch screen 150 by allowing the mobile terminal 900 to contact a specific area on the touch screen 150.

In the above description, it is assumed that one mobile terminal is connected, but it is also possible to use a plurality of mobile terminals. In this case, the second operating system 182 or the third operating system may display image information according to the plurality of connected mobile terminals in the different areas on the touch screen 150, respectively.

Meanwhile, according to the above description, when an error occurs in any of the operating system programs executed by the vehicle control device 100 according to the embodiment of the present invention, another operating system program which normally operates displays image information in an area of the touch screen 150 controlled the operating system program with the error, for example. In this case, specific image information may be displayed according to the operating system program which normally operates as shown in FIG. 8, but in the case of the connected car state, information received from the mobile terminal 900 may display image information in an area of the touch screen 150 controlled by the operating system program with the error.

For example, in the present invention, if an error occurs in the second operating system 182, image information according to information transmitted from the mobile terminal 900 connected to the vehicle may be displayed in an area of the touch screen 150 controlled by the second operating system 182 until the error is recovered. This may be performed by the different operating system which normally operates (e.g., the first operating system 181 or the third operating system), or by the second operating system 182.

FIG. 11 shows an example in which image information is displayed in an area on the touch screen 150 on which image information of an operating system in which an error has occurred, in the vehicle control device according to the embodiment of the present invention.

First, a first drawing of FIG. 11 shows an example in which the first operating system 181 displays image information related to control and driving of the vehicle in the cluster region 210 and the second operating system 182 displays current position information 1120 and weather information 1130 of the vehicle respectively in the first infotainment area 220 and the second infotainment area 230, and in this state, an error occurs in the second operating system 182.

When an error occurs in the second operating system 182 as described above, the first operating system 181 may control areas of the touch screen 150 controlled by the second operating system 182, that is, the first and second infotainment areas 220 and 230 while the error is being recovered.

On the other hand, when the error occurs, the second operating system 182 may request the currently connected mobile terminal 900 to transmit image information to be displayed in the first and second infotainment areas 220 and 230. Then, the mobile terminal 900 may transmit image information according to the request of the second operating system 182, and the transmitted image information may be transmitted to the first operating system 181. Then, the first operating system 181 may display the information received from the mobile terminal 900 in the first and second infotainment areas 220 and 230.

Meanwhile, the information requested to the mobile terminal 900 may be at least one of the functions executed in the second operating system 182 before an error occurs in the second operating system 182. That is, as shown in the second drawing of FIG. 11, when position information 1120 of the vehicle and weather information 1130 are displayed respectively in the first and second infotainment areas 220 and 230 before the error occurs in the second operating system 182, the second operating system 182 may request the mobile terminal 900 to transmit the image information related to the current position information of the vehicle and the weather information before entering the recovery.

Then, the mobile terminal 900 can execute functions executed in the second operating system 182 before the error occurs, that is, the function related to the current position and weather information, which have been executed in the second operating system 182 before the error occurred. Also, as illustrated in a second drawing of FIG. 11, the mobile terminal 900 can transmit the current position information 1150 and weather information 1160 calculated or sensed according to the execution result of the related function to the vehicle.

Then, the first operating system 181 may display the information received from the mobile terminal 900 in the first and second infotainment areas 220 and 230. Accordingly, as illustrated in a third drawing of FIG. 11, the current vehicle position information 1150 and the weather information 1160 detected from the mobile terminal 900 may be displayed in the first and second infotainment areas 220 and 230. Accordingly, even when the second operating system 182 has an error and recovery thereof is being performed, the user may be continuously provided with related information, regardless of the error recovery. Also, when recovery of the second operating system 182 is completed, image information under the control of the second operating system 182 may be displayed again in the first and second infotainment areas 220 and 230. That is, the vehicle control device 100 according to the embodiment of the present invention may prevent the user from recognizing the error even when the error occurs in the second operating system 182 and the recovery process is performed.

Meanwhile, the first operating system 181 may provide only a function of displaying information received from the currently connected mobile terminal 900 in the first and second infotainment areas 220 and 230. That is, the first operating system 181 may connect only the image information displayed on the mobile terminal 900 and may determine displayed information or a display state of information according to the mobile terminal 900. Therefore, the safety and reliability standards (e.g., ISO 26262 and ASIL-B rating) that the first operating system 181 should satisfy may not be hindered.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:
1. A vehicle control device for displaying image information related to control of a vehicle, the vehicle control device comprising:
   one touch screen; and
   one controller including at least two different operating system programs which are independently driven and controlling the operating system programs to display each image information in the one touch screen,
   wherein the controller is configured to control the touch screen such that at least one of the operating system programs displays image information on the touch screen according to at least one of a state of the vehicle or an operation state of the operating system programs, wherein the touch screen displays a screen in which a plurality of layers overlap each other, and
wherein the controller is further configured to control the touch screen such that the operating system programs output image information to different layers among the plurality of layers.

2. The vehicle control device of claim 1, wherein the operating system programs include:
a first operating system program controlling a plurality of preset functions among functions related to a state of the vehicle and driving and controlling of the vehicle and displaying image information related thereto; and
a second operating system program controlling at least some of functions excluding functions controlled by the first operating system program, among functions provided in the vehicle, and displaying image information related thereto.

3. The vehicle control device of claim 2, wherein the first operating system program and the second operating system program are set to be different in safety and reliability level related to whether connection to another device is restricted and whether a user input is restricted, and
wherein the first operating system program is designed to satisfy at least one preset international safety standard.

4. The vehicle control device of claim 2, wherein when a plurality of operating system programs operate, the operating system programs display image information in different areas of the touch screen, and an area on the touch screen in which image information is displayed by the first operating system is an area in which user's touch input is restricted.

5. The vehicle control device of claim 4, wherein the controller changes a position or a size of an area in which image information corresponding to each operating system program is displayed, according to a user's touch input.

6. The vehicle control device of claim 2, wherein the controller is driven in any one of a plurality of different operation modes according to a result of detecting a state of the vehicle, and, in the plurality of different operation modes, at least one of a number or a type of operating system programs displaying image information on the touch screen and functions provided in the operating system programs is different.

7. The vehicle control device of claim 6, wherein the result of detecting a state of the vehicle is a result of detecting at least one of a speed of the vehicle, a position of the vehicle, weather and intensity of illumination around the vehicle, presence or absence of another vehicle or an obstacle near the vehicle, or a number of occupants present in the vehicle.

8. The vehicle control device of claim 7, wherein when a speed of the vehicle is a preset level or higher, the controller is driven in an operation mode in which pieces of image information related to functions controlled by the first operating system program is displayed in an entire area of the touch screen.

9. The vehicle control device of claim 4, wherein the touch screen is formed such that, when an error occurs in at least one of the operating system programs, an area of the touch screen in which image information of the error-generated operating system program is displayed is controlled by another operating system program which normally operates.

10. The vehicle control device of claim 9, wherein the first operating system program displays image information according to functions managed by the first operating system program in a partial area on the touch screen controlled according to the second operating system program until the second operating system program recovers the error.

11. The vehicle control device of claim 2, wherein any one of the functions controlled by the second operating system program is a function of displaying image information corresponding to information received from a mobile terminal connected to the vehicle in at least some of areas on the touch screen displaying image information under the control of the second operating system program, and
wherein the information received from the mobile terminal is information related to a screen displayed on a display unit of the mobile terminal or information related to any one of functions executable in the mobile terminal.

12. The vehicle control device of claim 11, wherein the second operating system program executes a function corresponding to the information received from the mobile terminal and displays image information related to the executed function in a partial area on the touch screen controlled by the second operating system program.

13. The vehicle control device of claim 11, wherein the controller divides some of areas on the touch screen controlled by the second operating system program into a plurality of areas, and displays image information corresponding to pieces of different information received from the mobile terminal in each of the plurality of areas.

14. The vehicle control device of claim 13, wherein the pieces of different information received from the mobile terminal are pieces of information received from different mobile terminals connected to the vehicle.

15. The vehicle control device of claim 11, wherein when an error occurs in the second operating system program, the first operating system program displays image information according to information received from the mobile terminal in a partial area on the touch screen controlled according to the second operating system program until the error is recovered.

16. The vehicle control device of claim 15, wherein the information received from the mobile terminal is information related to a specific function executed in the mobile terminal, and
wherein the specific function is a function corresponding to at least one of functions executed by the second operating system program before the error of the second operating system program occurs.

17. The vehicle control device of claim 1, wherein the controller controls the operating system programs to share at least a partial area of a memory so that the operating system programs can simultaneously use the information stored in the at least partial area of the memory.

18. The vehicle control device of claim 17, wherein the operating system programs display pieces of different information related to the information stored in the shared memory area, in different areas on the touch screen.

19. A method for controlling a vehicle control device which controls a vehicle by operating system programs which are independently driven, the method comprising:
detecting at least one of a speed of the vehicle, a current position of the vehicle, or internal and external environments of the vehicle; and
displaying pieces of image information related to functions of the vehicle controlled by each of the operating system programs in different areas of a touch screen provided in the vehicle according to a detection result,
wherein the touch screen displays a screen in which a plurality of layers overlap each other, wherein the displaying of pieces of image information on the touch screen includes:

displaying, by at least one of the operating system programs, image information on the touch screen according to at least one of a detected state of the vehicle or an operation state of the operating system programs, and wherein the pieces of image information are output to different layers among the plurality of layers by each of the operating system programs.

* * * * *